United States Patent
Iwatani

(10) Patent No.: US 8,131,466 B2
(45) Date of Patent: Mar. 6, 2012

(54) NAVIGATION SYSTEM, ENLARGED INTERSECTION IMAGE DISPLAYING METHOD USED IN THE SYSTEM, AND MAP INFORMATION GENERATING METHOD

(75) Inventor: Tatsunori Iwatani, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 950 days.

(21) Appl. No.: 12/028,298

(22) Filed: Feb. 8, 2008

(65) Prior Publication Data
US 2008/0208466 A1 Aug. 28, 2008

(30) Foreign Application Priority Data
Feb. 28, 2007 (JP) .................. 2007-048843

(51) Int. Cl.
*G01C 21/32* (2006.01)
*G08G 1/123* (2006.01)
(52) U.S. Cl. ............... 701/437; 340/995.2; 340/995.22
(58) Field of Classification Search .......... 701/211, 701/400, 428, 431, 432, 437; 340/990, 995.1, 340/995.14, 995.15, 995.17, 995.2, 995.22, 340/995.23; 382/104, 106; 715/211
See application file for complete search history.

(56) References Cited

U.S. PATENT DOCUMENTS

| | | | | |
|---|---|---|---|---|
| 5,729,109 A * | 3/1998 | Kaneko et al. | ............... | 318/587 |
| 6,243,646 B1 | 6/2001 | Ozaki et al. | | |
| 6,249,740 B1 * | 6/2001 | Ito et al. | ............... | 701/200 |
| 6,347,280 B1 * | 2/2002 | Inoue et al. | ............... | 701/211 |
| 6,453,235 B1 * | 9/2002 | Endo et al. | ............... | 701/211 |
| 6,473,693 B1 * | 10/2002 | Kusama | ............... | 701/211 |
| 6,611,753 B1 * | 8/2003 | Millington | ............... | 701/209 |
| 7,089,111 B2 * | 8/2006 | Irie | ............... | 701/211 |
| 7,349,801 B2 * | 3/2008 | Kim | ............... | 701/209 |
| 7,383,126 B2 * | 6/2008 | Takahashi | ............... | 701/211 |
| 7,483,785 B2 * | 1/2009 | Suzuki et al. | ............... | 701/200 |
| 7,698,063 B2 * | 4/2010 | Kim | ............... | 701/211 |
| 2004/0162672 A1 * | 8/2004 | Kim | ............... | 701/209 |
| 2005/0149262 A1 * | 7/2005 | Oikubo | ............... | 701/211 |
| 2005/0154505 A1 * | 7/2005 | Nakamura et al. | ............... | 701/1 |
| 2005/0159884 A1 * | 7/2005 | Suzuki et al. | ............... | 701/208 |

FOREIGN PATENT DOCUMENTS

JP 11-51685 2/1999

* cited by examiner

*Primary Examiner* — John Nguyen
*Assistant Examiner* — Michael Whalen
(74) *Attorney, Agent, or Firm* — Brinks Hofer Gilson & Lione

(57) ABSTRACT

When a vehicle travels along a guidance path and approaches an intersection, a vehicle navigation system determines crossing points between a circle having its center set to the intersection and a predetermined radius, and an approach link and an exit link for the intersection. The system also sets a direction connecting the crossing point for the approach link and the intersection as an approach direction, and sets a direction connecting the intersection and the crossing point for the exit link as an exit direction. The system determines a traveling direction at the intersection based on an angular difference between the approach direction and the exit direction, and determines a display position of the intersection on a screen. Further, an enlarged intersection image is drawn such that the approach direction is aligned with a 12 o'clock direction on the screen.

20 Claims, 20 Drawing Sheets

0 DEGREES

0 DEGREES

FIG. 14

| | | |
|---|---|---|
| CPID | INTERSECTION ID | |
| CPLK | INTERSECTION LINK INFORMATION | |
| | INTERSECTION LINK ID | LINK SHAPE DATA (SHAPE COMPLEMENTATION CODE) |
| | LINK $L_0$ | $P_0$ |
| | LINK $L_1$ | $P_{11}$, $P_{12}$, $P_1$ |
| | LINK $L_2$ | $P_{21}$, $P_{22}$, $P_2$ |
| | LINK $L_3$ | $P_{31}$, $P_3$ |
| GSCD | INTERSECTION IN-VEHICLE VOICE NAVIGATION INFORMATION | |
| | APPROACH LINK | EXIT LINK | VOICE CODE |
| | LINK $L_0$ | $L_1$ | LEFT-TURN CODE |
| | | $L_2$ | STRAIGHT CODE |
| | | $L_3$ | RIGHT-TURN CODE |
| | LINK $L_1$ | $L_0$ | ... |
| | | $L_2$ | ... |
| | | $L_3$ | ... |
| | LINK $L_2$ | $L_0$ | ... |
| | | $L_1$ | ... |
| | | $L_3$ | ... |
| | LINK $L_3$ | $L_0$ | ... |
| | | $L_1$ | ... |
| | | $L_2$ | ... |

GSCD

| APPROACH LINK | EXIT LINK | EXIT LINK | VOICE CODE |
|---|---|---|---|
| $L_0$ | $L_3$ | $L_{31}$ | RIGHT-TURN + LEFT-TURN |
| | $L_3$ | $L_{32}$ | RIGHT-TURN + STRAIGHT |

NAVIGATION SYSTEM, ENLARGED INTERSECTION IMAGE DISPLAYING METHOD USED IN THE SYSTEM, AND MAP INFORMATION GENERATING METHOD

BACKGROUND OF THE INVENTION

The present application claims priority to Japanese Patent Application Number 2007-048843, filed Feb. 28, 2007, the entirety of which is hereby incorporated by reference.

1. Field of the Invention

The present invention relates to a navigation system, an enlarged intersection image display method used in the system, and a map information generating method. In particular, the present invention relates to a navigation system that displays an enlarged intersection image on a screen when a vehicle traveling along a guiding path reaches an intersection, and generates map information including voice information for informing a driver of a traveling direction at the intersection by voice.

2. Description of the Related Art

Conventional navigation systems detect a vehicle position and read map data at the vehicle position and its surroundings from a map recording medium (for example, a CD-ROM, a DVD disk, or a hard disk) in order to draw a map image on a display screen. The system also draws a vehicle position mark in a predetermined position on the map image. As the vehicle position changes in accordance with the movement of the vehicle, the map screen is scrolled but the vehicle position mark is fixed at a predetermined position on the screen to allow the driver to grasp map information for the vehicle position and its surroundings at a glance anytime. In addition to the functions described above, conventional navigation systems are equipped with a guidance path function that searches for a guiding path from a place of departure to a destination and displays the guiding path on a map screen. Conventional systems also have a function that displays an enlarged intersection image on ½ of the screen to indicate a traveling direction at an intersection. The system also displays an arrow or informs a driver by voice of the correct traveling direction at an intersection when the vehicle approaches the intersection.

An intersection guidance unit of the navigation system draws an enlarged intersection image on the screen to align the approach direction of an intersection with a 12 o'clock direction. The intersection guidance unit also draws an arrow image indicating the approach direction on the enlarged intersection image. Further, the intersection guidance unit fixes a coordinate position for the intersection in a vertical direction on the screen regardless of which direction the vehicle is traveling. However, the intersection guidance unit controls the horizontal coordinate position of the intersection on the screen in accordance with the traveling direction. For example, if the traveling direction of the vehicle at the intersection is a straight direction, a slight right turn direction, or a slight left turn direction, the intersection is displayed at the center of the screen in a horizontal direction. If the traveling direction of the vehicle at the intersection is a right turn direction or a sharp right turn direction, the intersection is displayed on the left side of the screen, as viewed in the horizontal direction. If the traveling direction of the vehicle at the intersection is a left turn direction or a sharp left turn direction, the intersection is displayed on the right side of the screen as viewed in a horizontal direction. The enlarged intersection image helps a driver to grasp traffic flow in areas along the traveling direction.

Further, the intersection guidance unit determines a direction in which the vehicle travels, on the basis of an angular difference between a direction in which the vehicle approaches the intersection and a direction in which the vehicle exits from the intersections and informs the driver of the determined traveling direction.

In a conventional car navigation system the enlarged intersection image display and intersection voice navigation determines an intersection approach direction and an intersection exit direction by utilizing coordinate information contained in digitalized map data (line map). The angular difference between the two directions is then used to determine a traveling direction at the intersection and control the enlarged intersection image display and the intersection voice navigation based on the traveling direction.

A road is represented by nodes and a link connecting the nodes. The link is represented by inserting shape complementary points between the nodes, which are used in broken line approximation. An approach direction for an approach link at an intersection corresponds to a direction connecting the intersection and the shape complementary point of the approach link positioned closest to the intersection.

FIG. 19A shows an example of the digitalized map data containing four links $L_0$ to $L_3$, which includes nodes $P_0$ to $P_3$. The links $L_0$ to $L_3$ are connected to an intersection O. The links $L_0$ to $L_3$ also include shape complementary points $P_{11}$, $P_{21}$, and $P_{31}$, which represent exits along the links $L_0$ to $L_3$ that are located near the intersection O. As shown in FIG. 19B, assuming that the link $L_1$ is an approach link and the link $L_2$ is an exit link, an approach direction corresponds to a direction A that connects the intersection node $P_0$ and the shape complementary point $P_{11}$ closest to the intersection node $P_0$ of the approach link $L_1$. The exit direction is defined by a direction B connecting the intersection node $P_0$ and the shape complementary point $P_{21}$ that is closest to the intersection node $P_0$.

An enlarged intersection image is drawn on a screen such that the intersection approach direction A is aligned with a 12 o'clock direction. Thus, as shown in FIG. 20, the image is displayed on a screen SCR with the link L1 not completely aligned with a 12 o'clock direction on the displayed image. Further, the exit angle is the angle θ between the approach direction A and the exit direction B (see FIG. 19B), and the traveling direction at the intersection is considered to be a slight left turn direction or a straight direction. As shown in FIG. 20, the intersection is displayed at the horizontal center of the screen. This display orientation causes the area around the link $L_2$, which is actually desired, to be insufficiently displayed. Additionally, although a driver feels that the traveling direction is a left turn direction, the traveling direction is erroneously announced as a slight left turn direction or a straight direction.

FIGS. 21A and 21B illustrate a conventional intersection guidance method in which an enlarged image of a 600 ft.×600 ft. area surrounding the intersection is displayed on the screen. In FIG. 21A, O represents an intersection, $L_1$ represents an approach link, and $L_2$ represents an exit link. In the case of voice guided navigation, the main points P1 and $P_{11}$ of the approach link $L_1$ are not aligned with the 12 o'clock direction, as shown in FIG. 21B. In addition, the voice navigation incorrectly says "Proceed straight (straight direction)", instead of "Keep slight left (slight left turn direction)".

FIGS. 22A and 22B illustrate an intersection display position within the enlarged intersection image. In general, if the traveling direction is a right turn direction or a sharp right turn direction, the intersection is displayed on the left side of the intersection display, as shown in FIG. 22A. In FIGS. 22A and 22B, A represents the length of the screen in the horizontal direction, and the intersection is displayed in a position of A/6, as measured from the left side of the screen, in order to display the area near the traveling direction in detail. Further, if the traveling direction is a left turn direction or a sharp left turn direction, the intersection is displayed on the right side as viewed in the horizontal direction of the screen as shown in FIG. 22B, for example in a position of A*⅘, as measured from the left side, to display an area in the traveling direction in detail. If the approach link L1 is aligned in the 12 o'clock direction and a direction connecting the intersection O and the shape complementary point P21 is a slight right turn direction, as shown in FIG. 23A, the traveling direction at the intersection O is announced as a slight right turn direction although the driver feels that the traveling direction is a straight direction. This causes a problem in that the intersection is displayed on the left side of the enlarged intersection display, as shown in FIG. 23B. Thus not enough space is shown on the left side of the road, and too much space is shown on the right side of the road.

FIGS. 24A and 24B illustrate a conventional enlarged image display method for consecutive intersections. FIG. 24A shows an enlarged intersection image including intersections $O_1$ and $O_2$, where the distance between intersections $O_1$ and $O_2$ is within a preset distance. In this example, the enlarged intersection image is displayed such that a direction connecting the shape complementary point $P_{11}$ of the approach link $L_1$ and the intersection $O_1$ is aligned with the 12 o'clock direction. Thus, the traveling direction at the first intersection $O_1$ is a sharp left turn direction, and the traveling direction at the second intersection $O_2$ is a right turn direction. Further, the navigation system says "in about xxx miles, make a sharp left turn then right turn." However, as shown in FIG. 24B, this voice instruction is not consistent with the driver's perception.

Japanese Unexamined Patent Application Publication No. 11-51685 discloses a conventional technique of calculating angles at multiple sampling points on links of an intersection to determine a link direction in accordance with the calculated angles, and to output direction guidance information on the basis of the determination result.

However, this conventional technique calculates angles at multiple sampling points in order to determine a link direction, which requires complex calculations. Moreover, the conventional technique is not compatible with consecutive intersections.

SUMMARY OF THE INVENTION

Accordingly, it is an object of the present invention to determine a traveling direction at an intersection in a simple manner and thereby correctly announce a traveling direction and/or display an enlarged intersection image.

It is another object of the present invention to display an enlarged intersection image such that the entire link is aligned with a 12 o'clock direction.

It is still another object of the present invention to display as large an area as possible along a traveling direction.

It is yet another object of the present invention to correctly announce a traveling direction or display an enlarged intersection image even at two consecutive intersections.

In one aspect, the navigation system displays an enlarged intersection image on a screen of a display when a vehicle travels along a guidance path and approaches an intersection. The enlarged intersection image is displayed by defining a circle having a predetermined radius, with the center of the circle set to the intersection. Crossing points between the circle and an approach link and an exit link for an intersection are determined, and a direction connecting the crossing point for the approach link and the intersection is set as an approach direction. A direction connecting the crossing point for the exit link and the intersection is set as an exit direction. The enlarged intersection image is then drawn on the screen of the display such that the approach direction is aligned with a 12 o'clock direction, and a traveling direction arrow that extends from the approach direction toward the exit direction is drawn on the enlarged intersection image.

In another aspect, the enlarged intersection image is displayed by calculating an angular difference between the approach direction and the exit direction. A coordinate position of the intersection on the screen is then calculated based on the angular difference, and the enlarged intersection image is displayed such that the intersection overlaps the coordinate position.

In yet another aspect, the enlarged intersection image is displayed if a distance from a first intersection to a second intersection is determined to be less than or equal to a predetermined distance. If the first intersection and second intersection are located within the predetermined distance, a direction connecting the approach link and the first intersection is set as an approach direction for the first intersection. A direction connecting the first and second intersections is then set as an exit direction for the first intersection, if the distance between the first intersection and the second intersection is less than or equal to a preset distance. The enlarged intersection image including both the first and second intersections is drawn such that the approach direction for the first intersection is aligned with a 12 o'clock direction on the screen. Additionally, a first traveling direction arrow that extends from the approach direction toward the exit direction is also drawn on the screen.

In another aspect, the enlarged intersection image may be displayed by determining a crossing point between a link exiting from the second intersection and a second circle having a predetermined radius and its center set to the second intersection. A direction connecting the first intersection and the second intersection is then set as an approach direction for the second intersection, and a direction connecting the second intersection and the crossing point for the second circle is set as the exit direction for the second intersection. A second traveling direction arrow that extends from the approach direction for the second intersection toward the exit direction is then drawn on the screen of the display.

According to another aspect of the present invention, map information including voice information for announcing a traveling direction at an intersection is generated by retrieving shape data from map information for each link connected to an intersection node. Predetermined links are then set as approach links and exit links, and crossing points between a circle having its center set to an intersection and a predetermined radius, and an approach link and an exit link for the intersection are determined. A direction connecting the crossing point for the approach link and the intersection is set as an approach direction, and a direction connecting the intersection and the crossing point for the exit link is set as an exit direction. The angular difference between the approach direction and the exit direction is calculated, and a traveling direction at the intersection is determined based on the calculated angular difference. A voice code for announcing the traveling direction is then determined and the voice code is added to intersection data contained in the map information.

In another aspect, the map information including voice information is further generated by determining whether a distance from the first intersection to a second intersection is less than or equal to a preset distance. If the distance between the first intersection and the second intersection is less than or equal to the preset distance, a direction connecting the approach link and the first intersection is set as an approach direction for the first intersection, and a direction connecting the first intersection and the second intersection is set as an exit direction for the first intersection. An angular difference between the approach direction and the exit direction for the first intersection is then calculated in order to determine a traveling direction at the first intersection based on the calculated angular difference. A crossing point between a second circle having its center set to the second intersection and a predetermined radius, and a link exiting from the second intersection is determined, and a direction connecting the first intersection and the second intersection is set as an approach direction for the second intersection. A direction connecting the second intersection and the crossing point for the link exiting from the second intersection is then set as an exit direction for the second intersection, and voice codes for announcing traveling directions at the first and second intersections are determined and added to the intersection data.

According to another aspect of the present invention, a navigation system for displaying an enlarged intersection image on a screen when a vehicle travels along a guidance path and approaches an intersection includes: a guidance path memory configured to store a guidance path; an approach detecting unit configured to detect whether the vehicle is approaching an intersection on the guidance path; a display unit for displaying the enlarged intersection image, and an enlarged intersection image generating unit. The enlarged intersection image generating unit is configured to determine crossing points between a circle having a predetermined radius with its center set to the intersection, and an approach link and an exit link. The enlarged intersection image generating unit is also configured to set a direction connecting the crossing point for the approach link and the intersection as an approach direction, and set a direction connecting the intersection and the crossing point for the exit link as an exit direction. The enlarged intersection image generating unit is further configured to generate the enlarged intersection image such that the approach direction is aligned with a 12 o'clock direction on a screen, and generate a traveling direction arrow extending from the approach direction toward the exit direction.

In yet another aspect, the navigation system also includes an audio assist unit configured to retrieve a voice code for announcing a traveling direction that corresponds to an angular difference between the approach direction and the exit direction. The system then announces the traveling direction using the voice code.

According to an embodiment of the present invention, crossing points between a circle having a predetermined radius and its center set to a target intersection, and an approach link and an exit link (an approach link crossing point and an exit link crossing point) are calculated, a direction connecting the approach link crossing point and the intersection is defined as an approach direction, and a direction connecting the intersection and the exit link crossing point is defined as an exit direction. Further, a traveling direction at the intersection is determined on the basis of an angular difference between the approach direction and the exit direction, and a coordinate position of the intersection on a screen is calculated. Thus, a correct traveling direction can be announced and an enlarged intersection image that aligns the entire approach link with the 12 o'clock can be displayed.

Further, according to the present invention, a traveling direction can be correctly estimated. Accordingly, if a traveling direction is a straight direction, a slight right turn direction, or a slight left turn direction, an intersection can be displayed at the horizontal center of a screen. If the traveling direction is a right turn direction or a sharp right turn direction, the intersection can be displayed on the left side as viewed in a horizontal direction of the screen. If the traveling direction is a left turn direction or a sharp left turn direction, the intersection can be displayed on the right side as viewed in a horizontal direction of the screen. Therefore, according to the present invention, an area surrounding the traveling direction and information associated with the area can be presented to a user in more detail.

Moreover, according to the present invention, if two intersections are consecutive, a direction connecting an approach link crossing point and the first intersection is set as an approach direction, and a direction connecting the first intersection and a second intersection is set as an exit direction. A traveling direction for the first intersection is determined based on the angular difference between the approach direction and the exit direction of the first intersection. Additionally, a coordinate position on the screen for the intersection is determined, thus allowing the navigation system to correctly announce the traveling direction to a user and display an enlarged intersection image such that the entire approach link is aligned with the 12 o'clock direction on the screen.

Additionally, according to the present invention, a traveling direction at the first intersection can be correctly estimated. Thus, if the traveling direction at the first intersection is a straight direction, a slight right turn direction, or a slight left turn direction, the first intersection can be displayed at the horizontal center of the screen. If the traveling direction is a right turn direction or a sharp right turn direction, the intersection can be displayed on the left side of the screen, as viewed in a horizontal direction. If the traveling direction is a left turn direction or a sharp left turn direction, the intersection can be displayed on the right side of the screen, as viewed in a horizontal direction. Therefore, according to the present invention, the area surrounding a road in the traveling direction can be presented to a user in more detail even if two intersections are consecutive.

In another aspect of the present invention, it is possible to adjust a coordinate position of the first intersection in a vertical direction to display both the first and second intersections on a screen.

Furthermore, according to an embodiment of the present invention, in the case where two intersections are consecutive (that is, the two intersections are located in close proximity to each other), a crossing point between a circle having a predetermined radius and its center set to a second intersection and a link exiting from the second intersection is determined, and a direction extending from the first intersection to the second intersection is set as an approach direction. A direction connecting the second intersection and the crossing point for the second circle is set as an exit direction. Then, a traveling direction at the second intersection is determined based on the angular difference between the approach direction and the exit direction for the second intersection. Thus, a traveling direction at the second intersection can be correctly announced.

In another aspect, a voice code is inserted into the intersection data. The navigation system then uses the voice code to announce the traveling direction when the vehicle approaches the intersection, thus allowing the system to announce a correct traveling direction.

Furthermore, according to the present invention, even if multiple intersections are consecutive, a traveling direction can be announced using a similar method of inserting a voice code into the intersection data, and using the voice code to announce the traveling direction at the intersection when the vehicle approaches the intersection.

BRIEF DESCRIPTION OF THE DRAWINGS

FIG. 14 illustrates intersection information for the intersection including the four links shown in FIG. 13;

DESCRIPTION OF THE PREFERRED EMBODIMENTS (A) Principle of the Present Invention

Figure 1A:
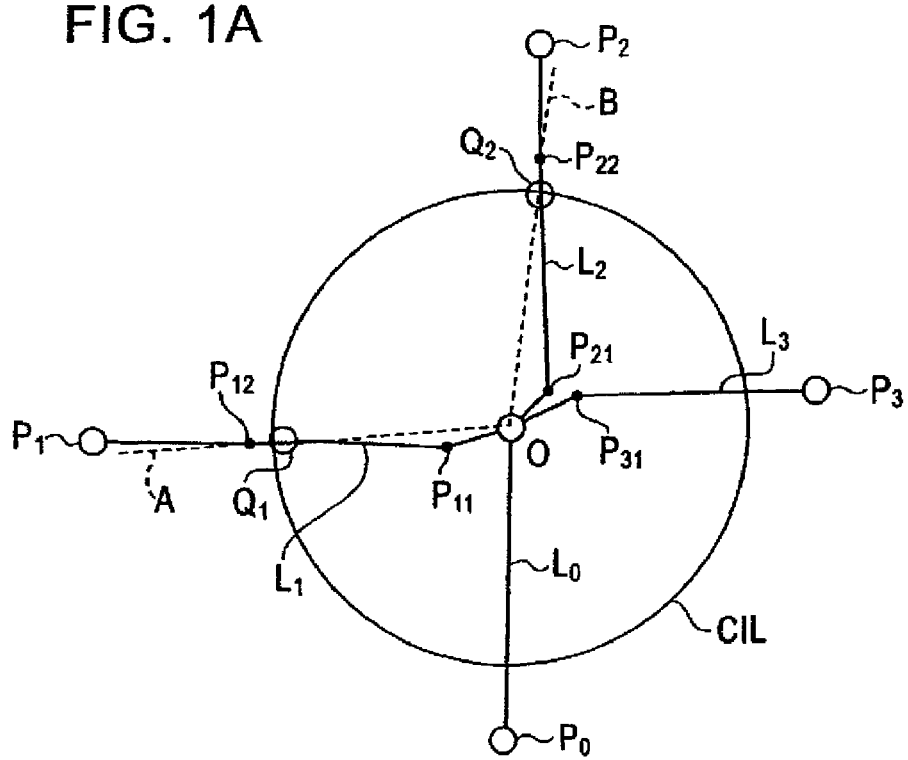
FIGS. 1A and 1B illustrate an enlarged intersection image display method according to an embodiment of the present invention.
Figure 1B:
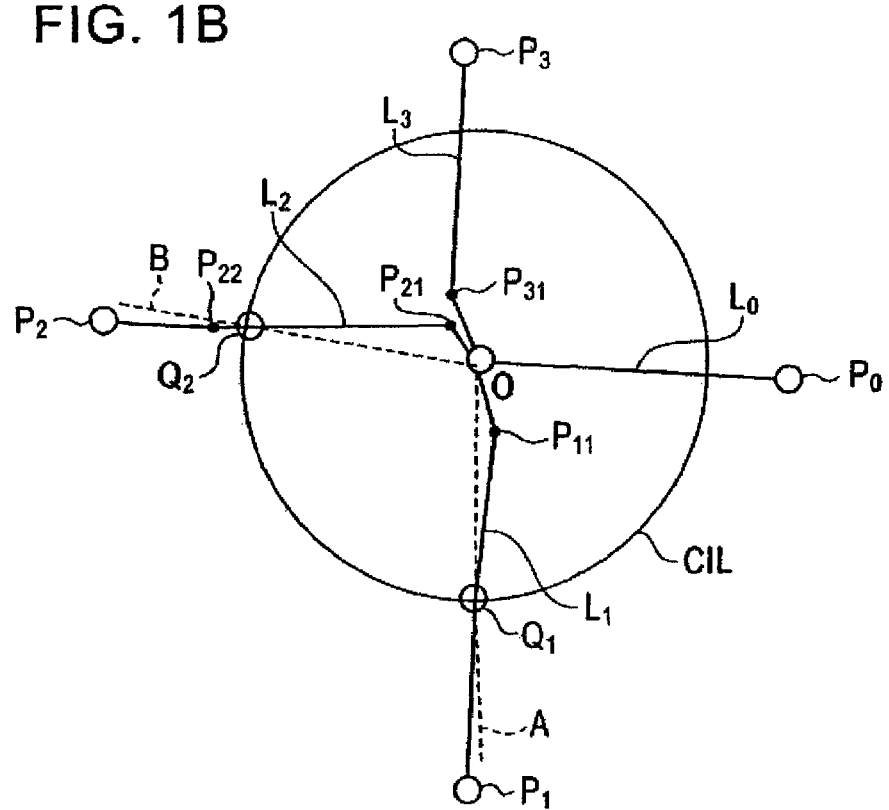

FIGS. 1A and 1B illustrate the principle of an enlarged intersection image displaying method according to an embodiment of the present invention. FIGS. 1A and 1B show links connected to an intersection. As shown in FIG. 1A, four links $L_0$ to $L_3$ including nodes $P_0$ to $P_3$ are connected to an intersection O, and shape complementary points $P_{11}$, $P_{21}$, and $P_{31}$ are exits near the intersection O.

According to an embodiment of the present invention, an approach direction and an exit direction are determined as follows. Initially, the crossing points $Q_1$ and $Q_2$ between the approach link $L_1$ and the exit link $L_2$ and a circle CIL having a predetermined radius, for example 200 feet, with the circle's center set as the intersection O are calculated. A direction connecting the approach link crossing point $Q_1$ and the intersection O is then set as an approach direction A, and a direction connecting the exit link crossing point $Q_2$ and the intersection O is set as an exit direction B. When the enlarged intersection image is displayed, the enlarged intersection image is drawn such that the approach direction A is aligned with the 12 o'clock direction, as shown in FIG. 1B.

Although not shown, a traveling direction arrow having a predetermined width and extending from the approach direction A to the exit direction B may also be drawn. As a result, it is possible to align the entire approach link $L_1$ with the 12 o'clock direction, and a traveling direction can be displayed as a left turn direction that is consistent with the driver's perception. Further, an angular difference between the approach direction A and the exit direction B is calculated, and a traveling direction is determined based on the angular difference. The navigation system then announces the traveling direction.

Figure 2:
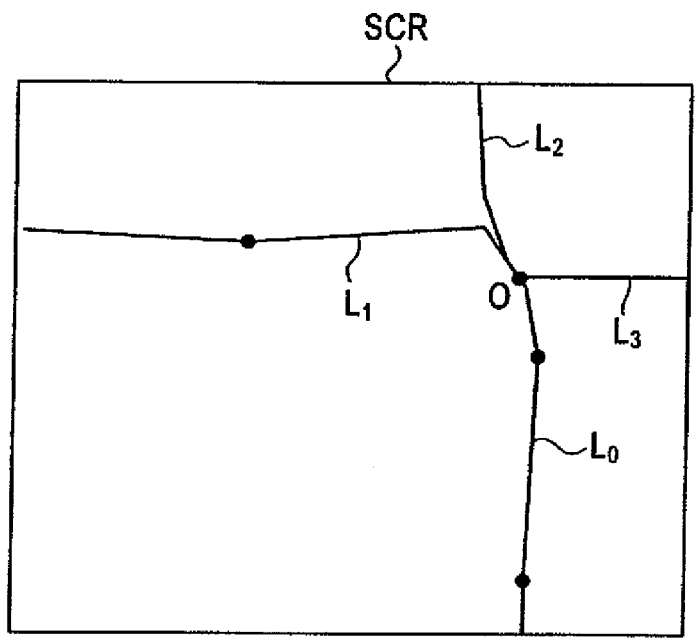
FIG. 2 illustrates an example of an intersection displayed when a traveling direction is a left-turn direction.

Furthermore, the traveling direction at the intersection O may be correctly determined as a left turn direction. Thus, as shown in FIG. 2, the intersection O is displayed on the right side of a screen SCR as viewed in a horizontal direction, for example, in a position of A*⅘ from the left end (not shown), and an area in the traveling direction can be displayed in detail.

Figure 3:
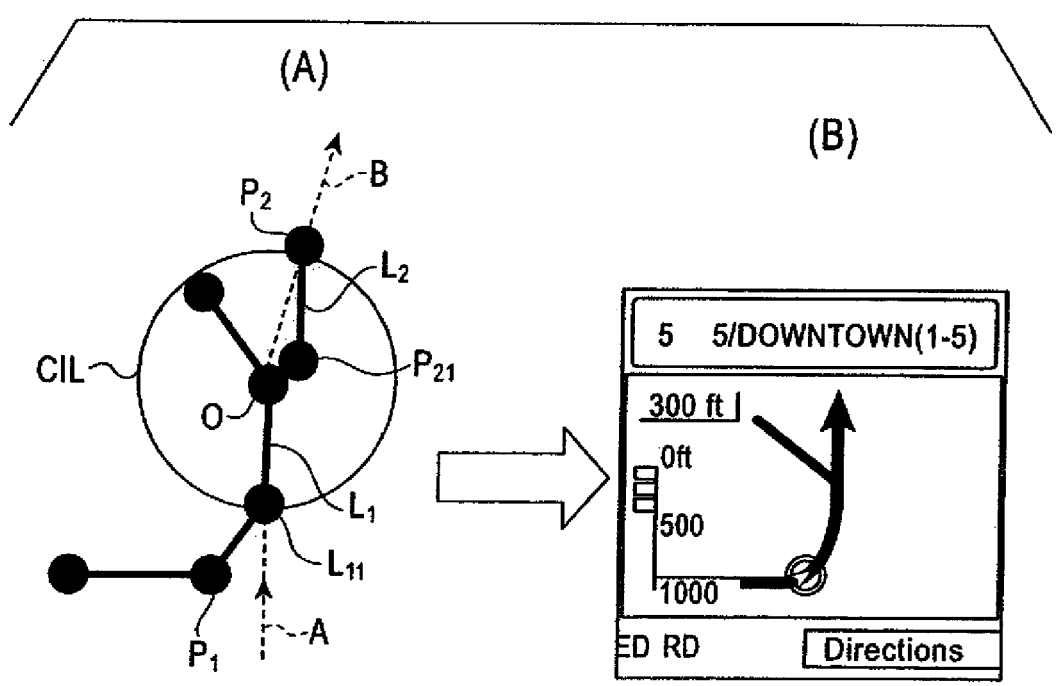
FIGS. 3A and 3B show an example of an enlarged intersection image displayed when a traveling direction is a straight direction.
Figure 23A:
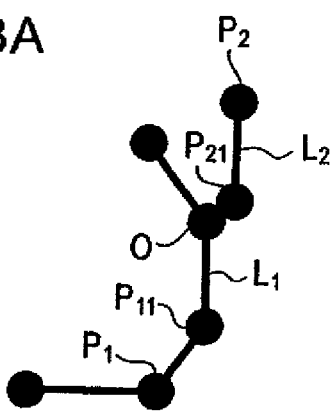
FIGS. 23A and 23B illustrate an example of a display screen in a conventional intersection guidance method.
Figure 23B:
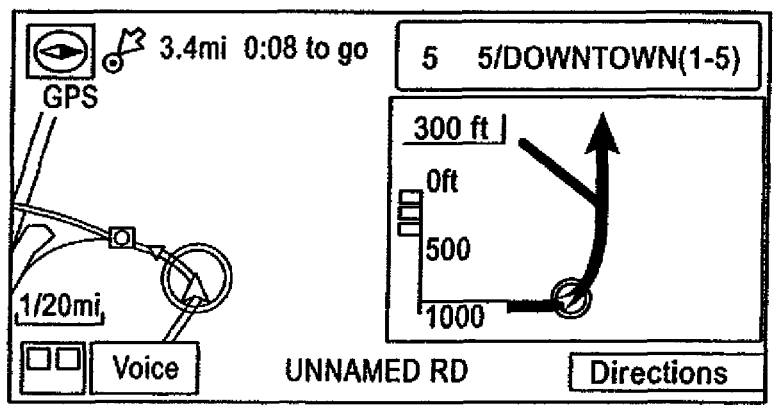
Figure 24A:
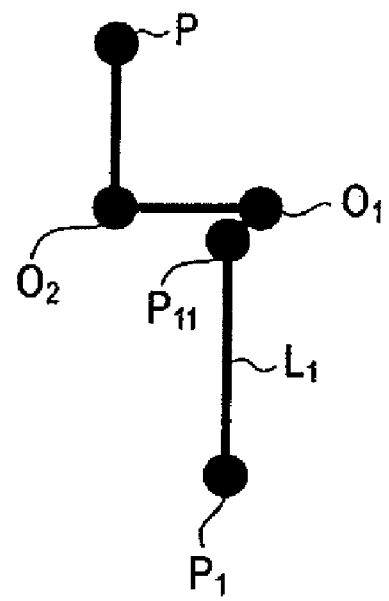
FIGS. 24A and 24B illustrate a conventional intersection guidance method for a double maneuver.
Figure 24B:
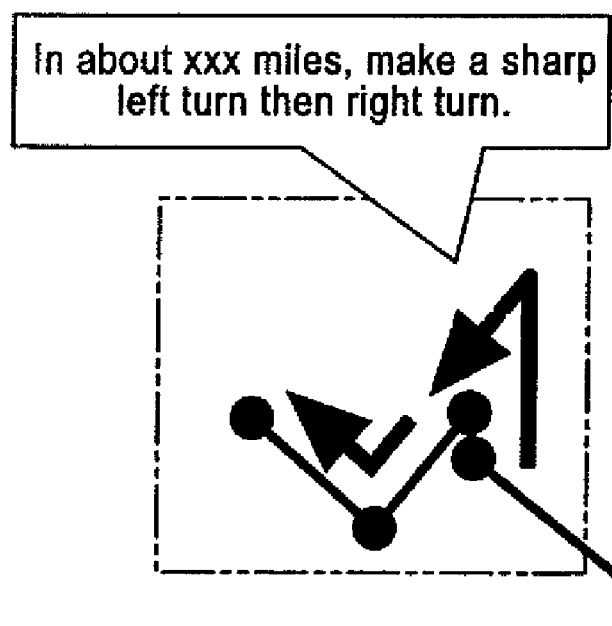

FIGS. 3A and 3B show an example of an enlarged intersection image displayed according to an embodiment of the present invention. For comparison, an example of an enlarged intersection image displayed by a conventional method is shown in FIGS. 23A and 23B. In FIG. 23A, the approach link $L_1$ is aligned with the 12 o'clock direction on the screen, and a direction connecting the shape complementary point $P_{21}$ of the approach link $L_2$ and the intersection O corresponds to a slight right turn direction. According to an embodiment of the present invention, directions connecting the intersection O and the crossing points between the approach link $L_1$ and the exit link $L_2$ and the circle CIL having a predetermined radius, are set as the approach direction A and the exit direction B respectively. Thus, the traveling direction may be correctly determined as "straight." As shown in FIG. 3B, the intersection may be displayed at the center of the screen in the horizontal direction. In the example of an enlarged intersection image displayed in a conventional method, as shown in FIGS. 23A and 23B, the intersection is displayed on the left side of the screen.

Figure 4A:
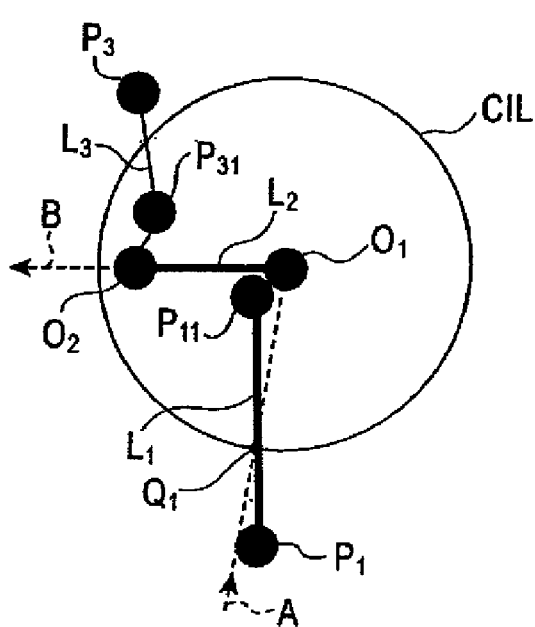
FIGS. 4A to 4C illustrate an example of an enlarged intersection image displayed when a target intersection is a double maneuver.
Figure 4B:
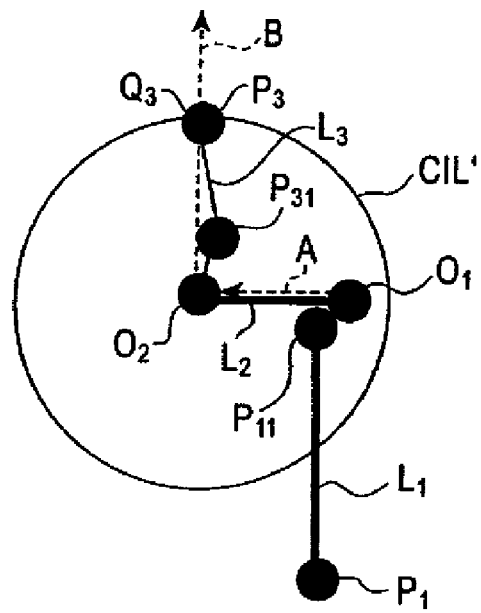

FIGS. 4A and 4B illustrate the principle of an enlarged intersection image display method in the case where a distance between consecutive intersections is less than or equal to a preset distance, for example 200 feet or less. In the illustrated example, $O_1$ and $O_2$ represent two intersections requiring a double maneuver, $L_1$ represents an approach link to a first intersection $O_1$, $L_2$ represents an exit link from the first intersection $O_1$ and an approach link to a second intersection $O_2$, which connects the intersections $O_1$ and $O_2$. The link $L_3$ represents an exit link from the second intersection $O_2$, $P_1$ represents a node of the approach link $L_1$, $P_{11}$ represents a shape complementary point of the approach link $L_1$, $P_3$ represents a node of the exit link $L_3$, and $P_{31}$ represents a shape complementary point of the exit link $L_3$. The term "double maneuver" refers to consecutive intersections located within a preset distance of each other (e.g. 200 feet).

The approach direction and exit direction at the first intersection are determined for a double maneuver as described below.

As shown in FIG. 4A, the circle CIL having a predetermined radius, for example 200 feet, with the center set as the first intersection $O_1$ is drawn, the crossing point $Q_1$ between the circle and the approach link $L_1$ is calculated, a direction connecting the approach link crossing point $Q_1$ and the intersection $O_1$ is set as the approach direction A, and a direction connecting the first intersection $O_1$ and the second intersection $O_2$ is set as the exit direction B. After the approach direction A and the exit direction B are set, an angular difference between the approach direction A and the exit direction B is calculated. A traveling direction is then determined based on the angular difference.

In the case of a double maneuver, the approach direction and exit direction at the second intersection are determined as follows. As shown in FIG. 4B, a circle CIL' having a predetermined radius, for example 200 feet, with the center set as the second intersection $O_2$ is drawn, and a crossing point $Q_3$ between the circle and the approach link $L_3$ is calculated. A direction connecting the first intersection $O_1$ and the second intersection $O_2$ is then set as the approach direction A, and a direction connecting the second intersection $O_2$ and the crossing point $Q_3$ is set as the exit direction B. After the approach direction A and the exit direction B are determined, an angular difference between the approach direction A and the exit direction B is calculated, and a traveling direction at the second intersection is determined based on the calculated angular difference.

When an enlarged intersection image for a double maneuver is displayed, the traveling direction at the first intersection $O_1$ is determined. If the traveling direction is a straight direction, a slight right turn direction, or a slight left turn direction, the first intersection $O_1$ is displayed at the horizontal center of the screen. If the traveling direction is a right turn direction or a sharp right turn direction, the first intersection $O_1$ is displayed on the left side of the screen as viewed in a horizontal direction. If the traveling direction is a left turn direction or a sharp left turn direction, the first intersection $O_1$ is displayed on the right side of the screen as viewed in a horizontal direction. Further, the vertical position of the first intersection is determined so as to display both the first and second intersections on the screen.

Figure 4C:
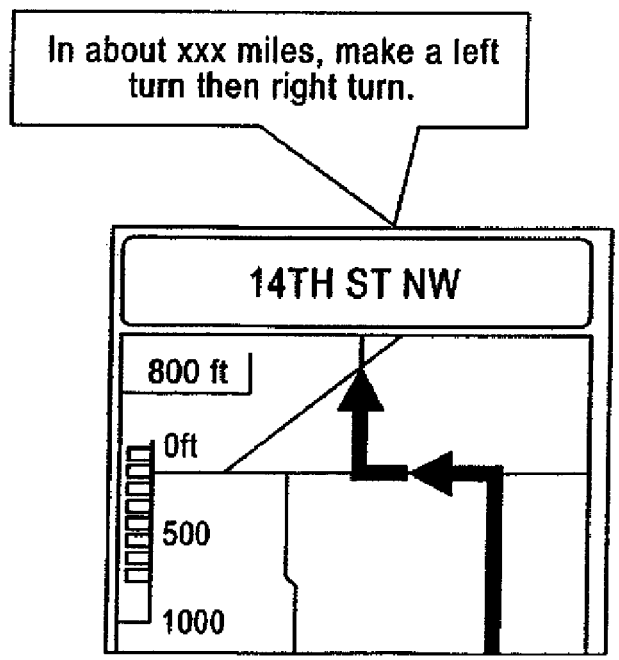

If the display position of the first intersection is determined as shown in FIG. 4C, an enlarged intersection image including the first and second intersections is drawn to align the approach direction at the first intersection $O_1$ with the 12 o'clock direction on the screen, and traveling directions at the first and second intersections are indicated by arrows. Further, the traveling directions at the first and second intersections are announced by the navigation system.

In order for the navigation system to announce the traveling directions, a voice code is inserted into intersection data of the map data beforehand, and a target direction is announced using the voice code included in the intersection data for the target intersection. That is, the traveling direction is determined by a method similar to the method of determining a traveling direction in the enlarged intersection image display method. Specifically, a voice code corresponding to the traveling direction is inserted into the intersection data, and a traveling direction is announced based on the voice code for the target intersection when the vehicle approaches the intersection.

(B) Traveling Direction

Figure 5A:
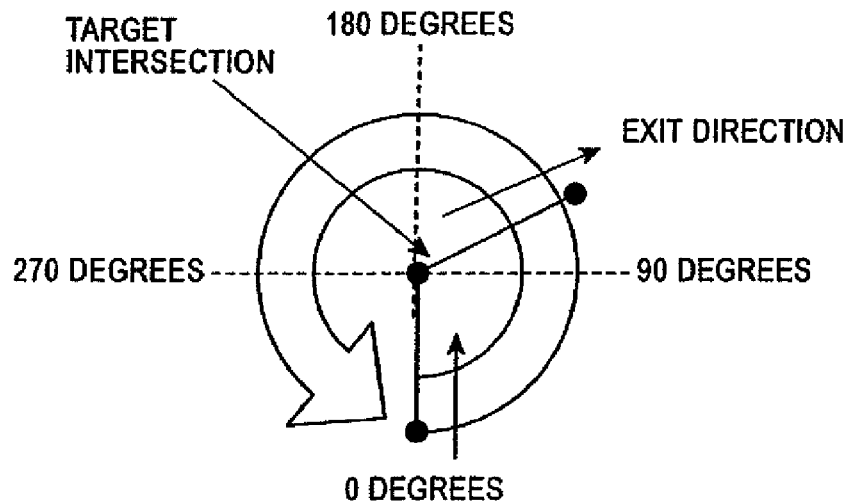
FIGS. 5A and 5B illustrate a traveling direction.
Figure 5B:
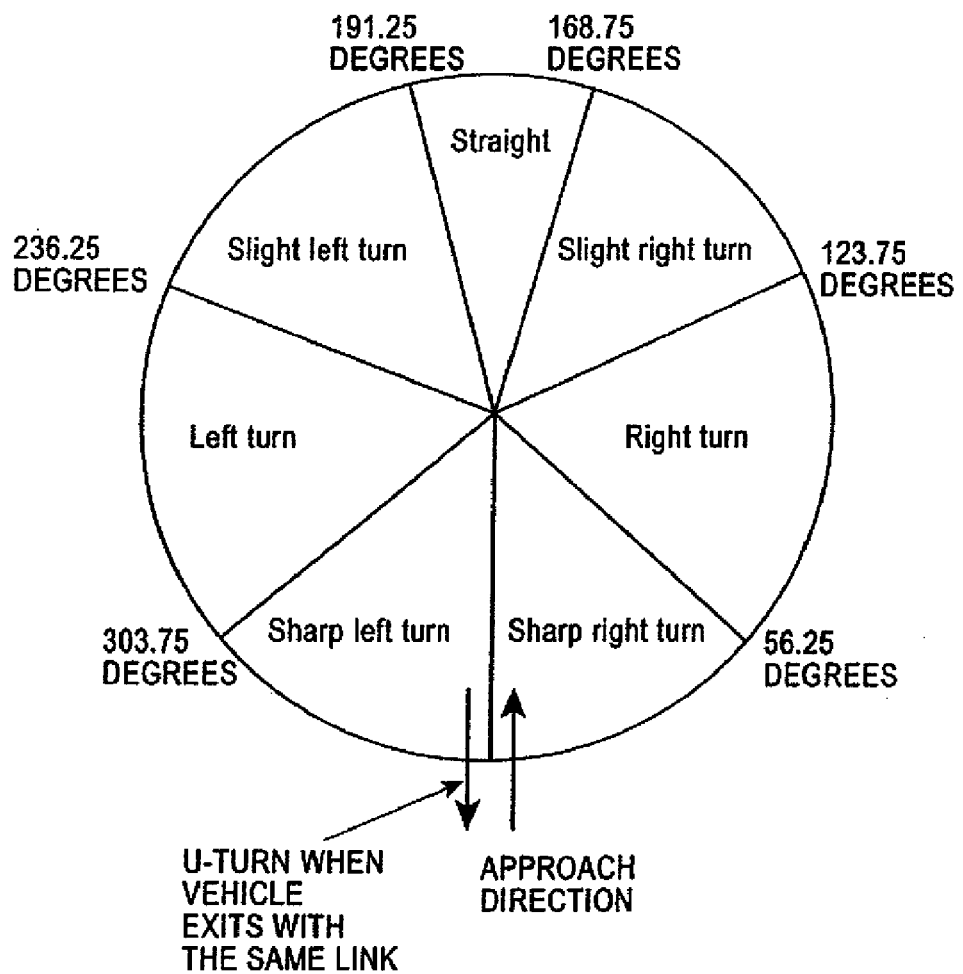

FIGS. 5A and 5B illustrate a traveling direction. In the example shown in FIG. 5A, an approach direction is aligned with a 12 o'clock direction and set as 0 degrees, with the angles increasing in a counterclockwise direction. FIG. 5B shows an example of the relationship between the traveling direction and an angular difference between an approach direction and an exit direction. An example of this relationship is as follows.

from about 0 to about 56.25 degrees: sharp right turn
from about 56.25 to about 123.75 degrees: right turn
from about 123.75 to about 168.75 degrees: slight right turn
from about 168.75 to about 191.25 degrees: straight
from about 191.25 to about 236.25 degrees: slight left turn
from about 236.25 to about 303.75 degrees: left turn
from about 303.75 to about 360 degrees: sharp left turn (C) Display Position of an Intersection on a Screen
(Single Intersection)

FIGS. 6A to 6F schematically illustrate a method of determining a display position of an intersection on a screen. In one embodiment, an enlarged intersection image is displayed on ½ of the screen, more specifically the enlarged intersection image is displayed on the right side of the screen. The screen itself has a rectangular shape, and each side corresponds to an actual distance A (in feet, ft., etc.); for example, A may be 600 ft. That is, the screen can display an enlarged image of an A×A (600 ft.×600 ft.) area.

Figure 6A:
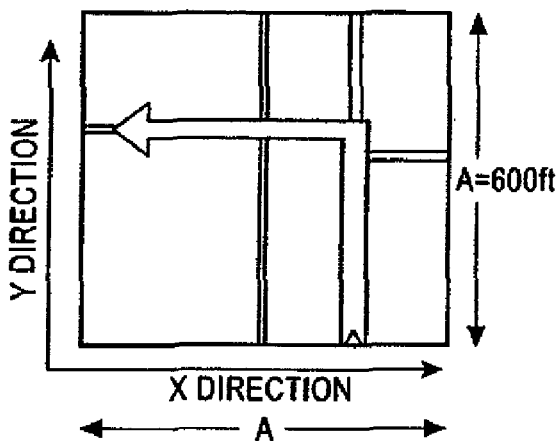
FIGS. 6A to 6F schematically illustrate a method for determining a display position of an intersection on a screen.
Figure 6B:
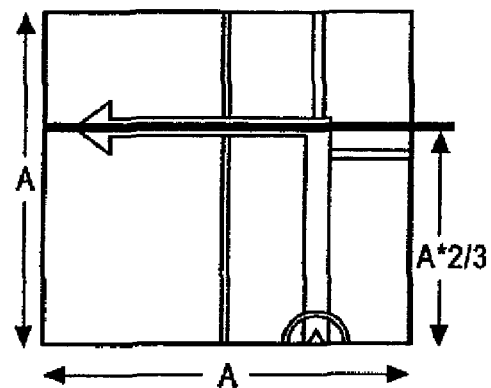

A position of the intersection is fixed at a predetermined height of $A*\frac{2}{3}$ from the lower end measured in a vertical direction, irrespective of the traveling direction, as shown in FIG. 6B. The position of the intersection in a horizontal direction is determined as follows.

Figure 6C:
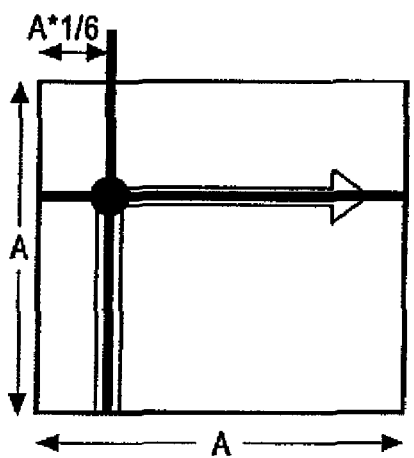

(1) If the traveling direction at the intersection is a right turn direction or a sharp right turn direction, the intersection is displayed on the left side of the screen as viewed in a horizontal direction, that is, in a position of $A*\frac{1}{5}$ from the left end, as shown in FIG. 6C.

Figure 6D:
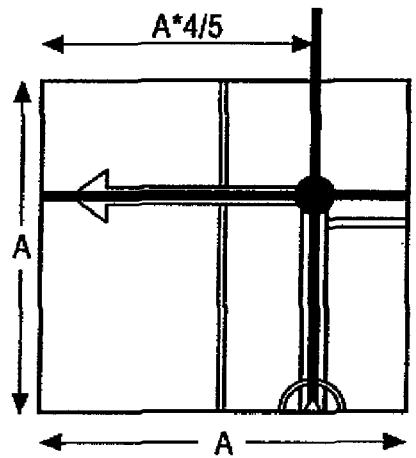

(2) If the traveling direction at the intersection is a left turn direction or a sharp left turn direction, the intersection is displayed on the right side of the screen as viewed in a horizontal direction, that is, in a position of $A*\frac{4}{5}$ from the left end, as shown in FIG. 6D.

Figure 6E:
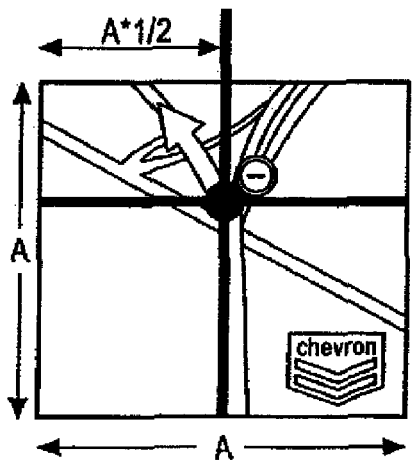

(3) if the traveling direction at the intersection is a straight direction, a slight right turn direction, or a slight left turn direction, the intersection is displayed at the center of the screen as viewed in a horizontal direction, that is, in a position of $A*\frac{1}{2}$ from the left end, as shown in FIG. 6E.

Figure 6F:
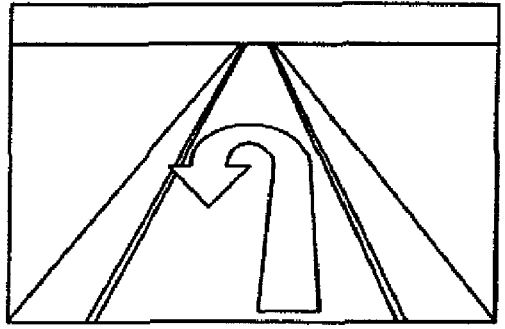

(4) If the traveling direction at the intersection is a U-turn, a preset U-turn image is displayed, as shown in FIG. 6F.

(Double Maneuver)

In the case of a double maneuver (consecutive intersections located within a predetermined distance), a horizontal display position of the first intersection is determined in accordance with the above rules (1) to (3) based on the traveling direction at the first intersection. Further, the vertical display position of the first intersection is assumed to be $A*\frac{3}{5}$. If the first and second intersections are outside of the predetermined area on the screen, the display position of the first intersection is adjusted vertically to display the two intersections within the area.

(D) Display Direction of Enlarged Intersection Image on Screen

Figure 7A:
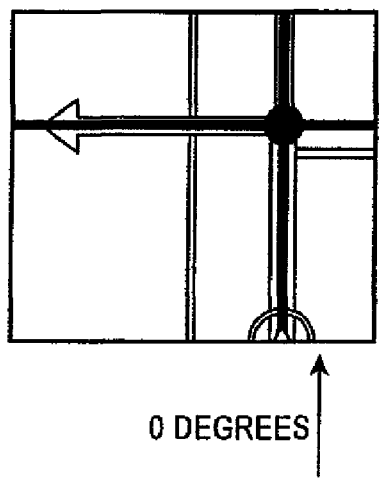
FIGS. 7A to 7C illustrate a display direction of an enlarged intersection image on a screen.
Figure 7B:
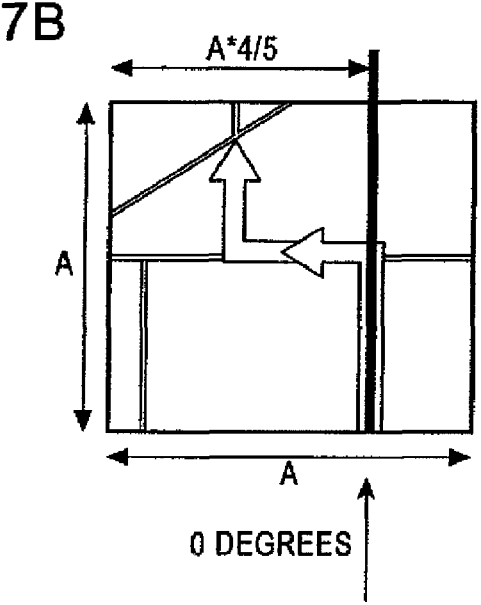
Figure 7C:
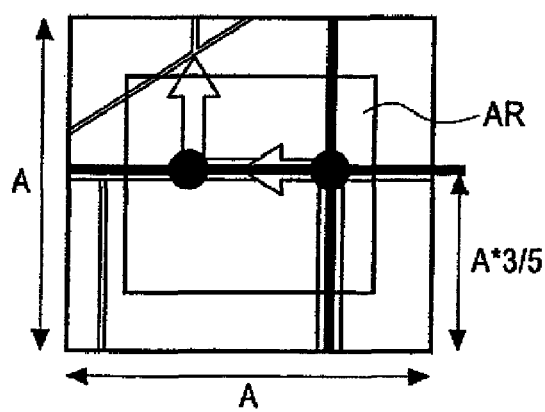
Figure 8A:
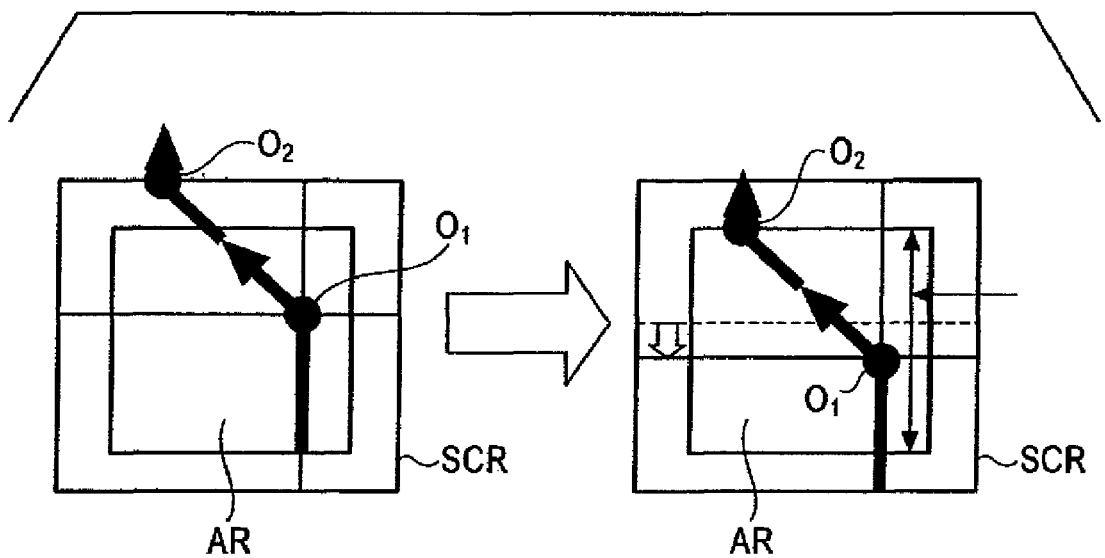
FIGS. 8A and 8B illustrate a method of adjusting a display position of a first intersection in a vertical direction to display two intersections within a predetermined area.
Figure 8B:
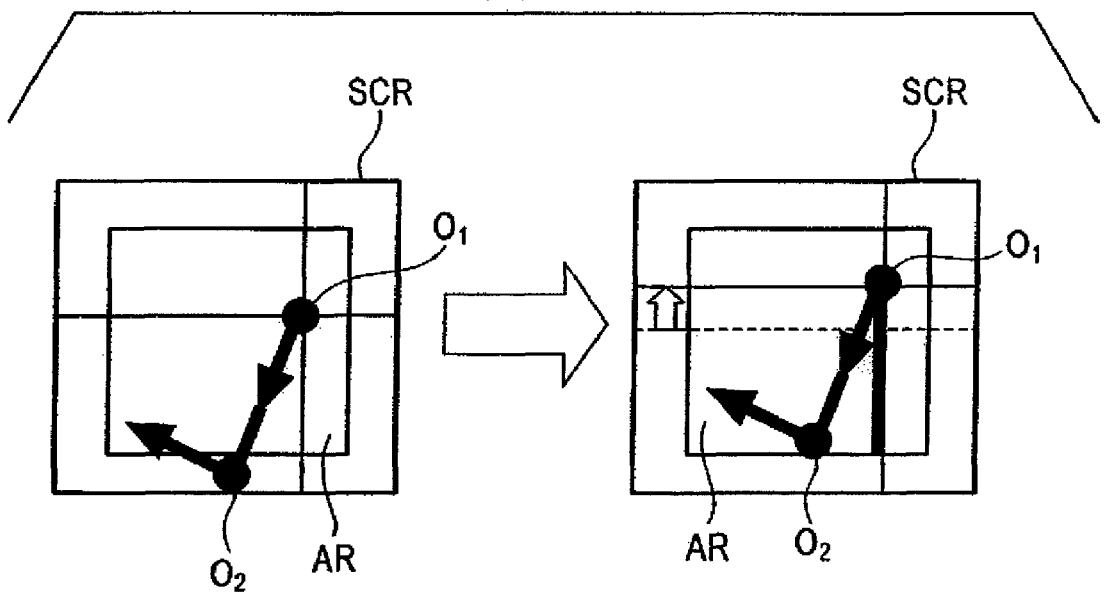

FIGS. 7A to 7C illustrate a display direction of an enlarged intersection image on a screen. If a target intersection is a single intersection, an enlarged intersection image is displayed on the screen to align the approach direction for the intersection with the 12 o'clock direction, as shown in FIG. 7A. If a target intersection is a double maneuver, an enlarged intersection image is displayed on the screen to align the approach direction for a first intersection with the 12 o'clock direction. A first traveling direction arrow is also displayed in a direction extending from the approach direction for the first intersection toward the exit direction for the first intersection, and a second traveling direction arrow is displayed extending in a direction from the approach direction for the second intersection toward the exit direction for the second intersection, as shown in FIG. 7B. In the case of a double maneuver, as shown in FIG. 7C, the vertical display position of the first intersection is assumed to be $A*\frac{3}{5}$. If the first and second intersections are outside a predetermined area AR on the screen, the display position of the first intersection is adjusted vertically to display the two intersections within the area AR. The area AR itself is a rectangular area measuring $A*\frac{3}{4}$ per side. FIGS. 8A and 8B illustrate a method of vertically adjusting the display position of the first intersection to display two intersections within the area AR. Consider the result if the double maneuver were displayed such that the first intersection is positioned in a vertical direction located at $A*\frac{3}{5}$. In this case, if the second intersection $O_2$ would be displayed in an upper portion outside the area AR, as shown in FIG. 8A, the display position of the first intersection $O_1$ is shifted vertically downward to display both the first and second intersections within the area AR. Further, if the double maneuver were displayed with the first intersection vertically positioned at $A*\frac{3}{5}$, and if the second intersection $O_2$ would be displayed in a lower portion that is outside the area AR, as shown in FIG. 8B, the display position of the first intersection $O_1$ is shifted vertically upward to display the first and second intersections within the area AR.

(E) Navigation System

Figure 9:
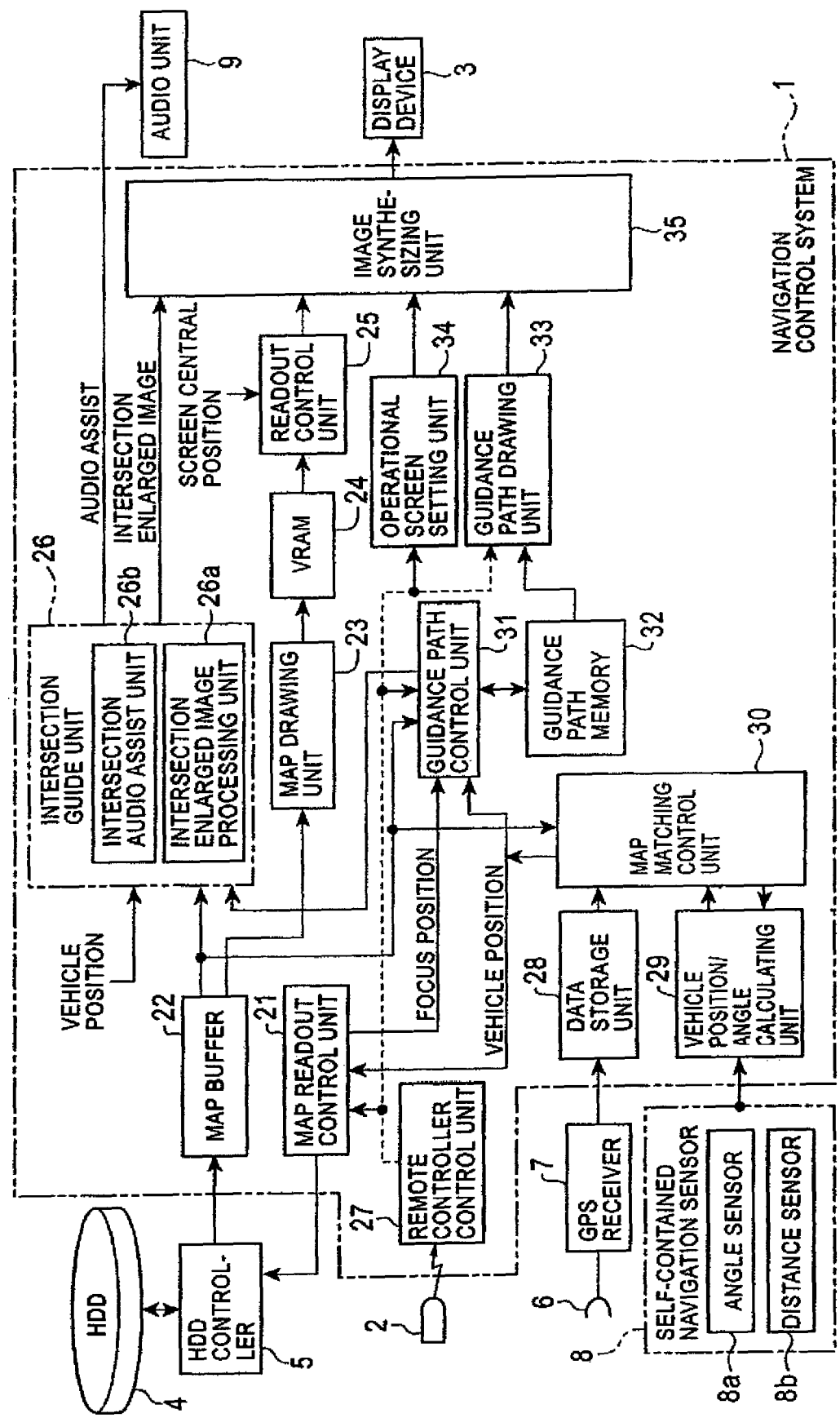
FIG. 9 is a diagram of an HDD navigation system that announces a traveling direction using map data including a voice code.

FIG. 9 is a diagram of an HDD navigation system for announcing a traveling direction using map data including voice code according to an embodiment of the present invention. The navigation system includes a navigation control system 1, a remote controller 2, a display device (color monitor) 3, an HDD (hard disk) 4, an HDD controller 5, a multi beam antenna 6, a GPS receiver 7, a self-contained navigation sensor 8, and an audio unit 9. The HDD (hard disk drive) 4 stores map data including voice code generated by a map information generating device as described below. The self-contained navigation sensor 8 is equipped with a relative azimuth sensor (angle sensor) 8a for detecting a turning angle of a vehicle such as a vibrating gyroscope and a distance sensor 8B for generating a pulse at predetermined intervals based on distance.

In the navigation control system I, a map readout control unit 21 determines a focus position (latitude and longitude positions of the center of a screen) when a driver operates the system to scroll a map or select a map with a joy stick key or zoom-in/out keys, and controls the HDD controller 5 based on the vehicle's position or a focus position to read predetermined map information from the HDD 4. A map buffer 22 stores map information read from the HDD. The buffer stores map information corresponding to multiple maps (multiple units) around the vehicle position or the focus position, for example, 3×3 units so as to scroll the map.

A map drawing unit 23 generates a map image using map information stored in the map buffer 22. A VRAM 24 stores a map image. A readout control unit 25 changes a display position of the map read from the VRAM 24 relative to a central position on the screen (vehicle position or focus position) to display a map while scrolling the screen in accordance with changes in the vehicle position or focus position.

An intersection guide unit 26 includes an enlarged intersection image processing unit 26a and an intersection audio assist unit 26b, and informs a driver of a traveling direction at a target intersection by displaying an enlarged intersection image and announcing the traveling direction. That is, when a vehicle approaches an intersection and reaches a position between the intersection and the vehicle that is less than or equal to a predetermined distance, the enlarged intersection image processing unit 26a displays an intersection guidance image (enlarged intersection image and traveling direction arrow) on a display screen and the intersection audio assist unit announces a traveling direction. The remote controller control unit 27 receives signals in accordance with a driver's operation of the remote controller and sends instructions to each unit. A GPS data storage unit 28 stores GPS data from the GPS receiver. A vehicle position/angle calculating unit 29 calculates a vehicle position (estimated vehicle position) and vehicle angle on the basis of output from the self-contained navigation sensor 8. A map matching control unit 30 executes a map matching process based on a map projection using map information stored in the map buffer 22, the estimated vehicle position, and the vehicle angle at predetermined intervals (for example, every 10 m) to adjust the position of the vehicle on the road.

A guidance path control unit 31 determines a guidance path (search path) from a departure place to a destination input into the navigation system. A guidance path memory 32 stores a guidance path. A guidance path drawing unit 33 reads guidance path information (node line information) from the guidance path memory 32 and draws a guidance path when the vehicle is running. An operational screen setting unit 34 creates various menu screens (operational screens). An image synthesizing unit composes various images to output the composite image.

(F) Enlarged Image Display Process Method

Figure 10:
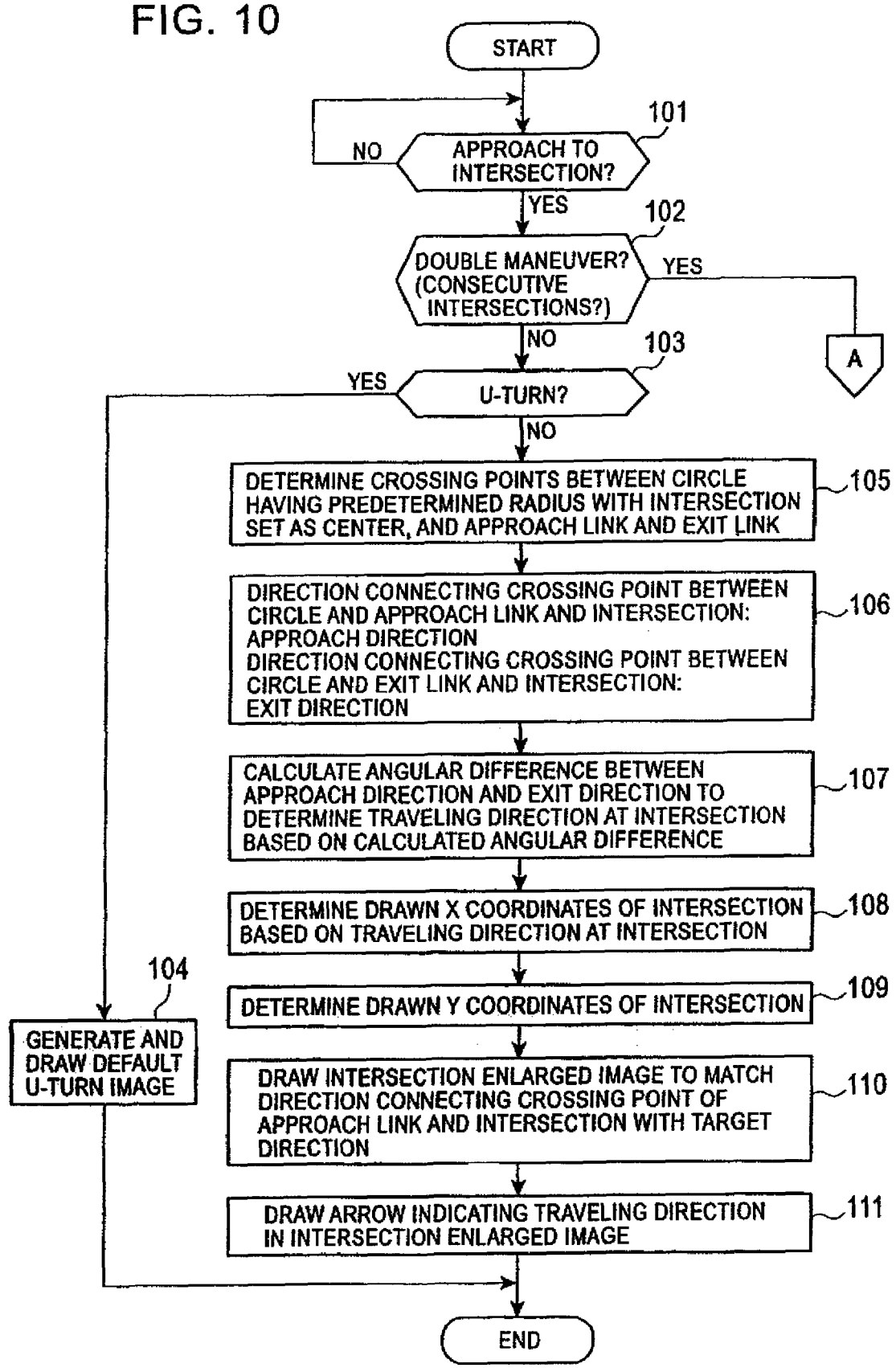
FIG. 10 is a flowchart of an enlarged intersection image display process according to an embodiment of the present invention.
Figure 11:
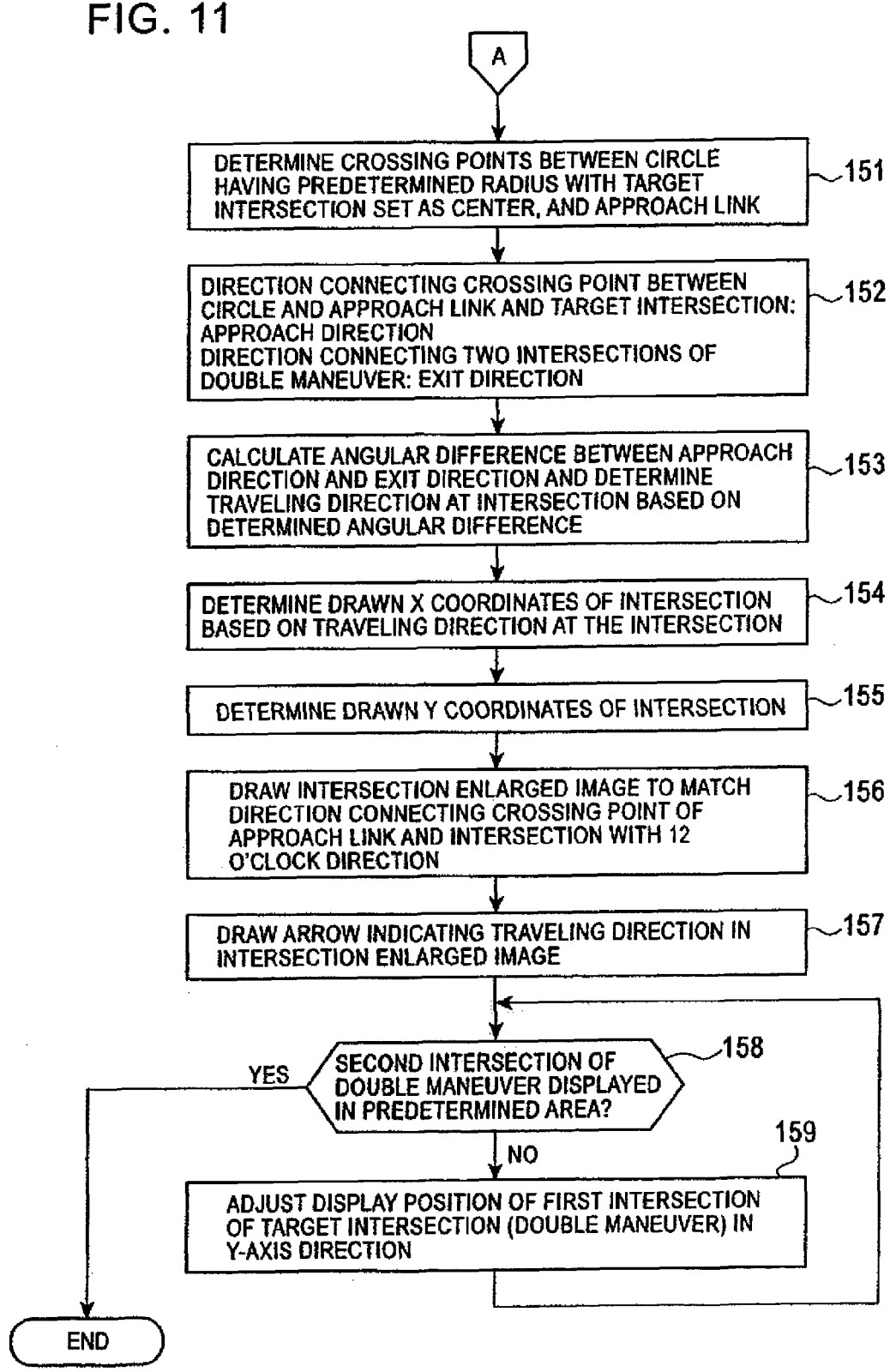
FIG. 11 is a flowchart of an enlarged intersection image display process according to an embodiment of the present invention.

FIGS. 10 and 11 show an enlarged intersection image display process method according to an embodiment of the present invention. The enlarged intersection image processing unit 26a of the intersection guide unit 26 references a vehicle position and guidance path information, to monitor a vehicle to determine whether or not the vehicle is approaching an intersection (step S101). If the vehicle approaches the intersection, the unit checks whether or not the intersection is a double maneuver (step S102). If the intersection is not a double maneuver, the unit checks whether or not a U-turn is selected (step S103). If the U-turn is selected, a preset U-turn image (see FIG. 6F) is displayed on the screen (step S104).

On the other hand, if a U-turn is not selected in step S103, a circle CIL having a predetermined radius with the center set to an intersection $O_1$ (see FIGS. 1A and 1B) is calculated. The system then calculates crossing points $Q_1$ and $Q_2$ (approach link crossing point and exit link crossing point) between the circle, and an approach link $L_1$ and an exit link $L_2$ (step S105). Then, a direction connecting the approach link crossing point and the intersection is set as an approach direction A, and a direction connecting the exit link crossing point and the intersection is set as an exit direction B (step S106). Once the approach direction and the exit direction are set; an angular difference between the approach direction and the exit direction is calculated to determine a traveling direction at the intersection based on the calculated angular difference (see FIG. 5B) (step S107).

Further, the unit determines a display coordinate position for the intersection in a horizontal direction on the screen in accordance with the traveling direction at the intersection (step S108). The unit also determines a display coordinate position for the intersection in a vertical direction on the screen (step S109). After that, the intersection is displayed in a display position on the screen and a 600 ft.×600 ft. enlarged intersection image is displayed on the screen SCR with a predetermined zoom factor. The approach direction to the intersection is aligned with the 12 o'clock direction (step S110). Finally, a traveling direction arrow extending from the approach direction to the exit direction is drawn on the enlarged intersection image (step S111) to complete the enlarged intersection image display process.

On the other hand, if the intersection is a double maneuver, as determined in step S102, a crossing point $Q_1$ (approach link crossing point) (see FIG. 4A) between the circle CIL having a predetermined radius with its center set to an intersection $O_1$ and an approach link $L_1$ is determined (step S151), as shown in FIG. 11. Next, a direction connecting the approach link crossing point $Q_1$ and the intersection $O_1$ is set as an approach direction A, and a direction connecting the first intersection $O_1$ and a second intersection $O_2$ is set as an exit direction B (step S152). When the approach direction and the exit direction are determined, an angular difference between the approach direction and the exit direction is calculated to determine a traveling direction at the first intersection based on the calculated angular difference (step S153). The system also determines, a crossing point $Q_3$ between a link $L_3$ exiting from the second intersection and a circle CIR' having a predetermined radius with its center set to the second intersection $O_2$ (see FIG. 4B). A direction connecting the first intersection $O_1$ and the second intersection $O_2$ is then set as an approach direction A, and a direction connecting the second intersection $O_2$ and the crossing point $Q_3$ is set as an exit direction B. The approach direction A and exit direction B for the second intersection are used to calculate an angular difference, and a traveling direction at the second intersection is determined based on the angular difference.

Next, a horizontal display coordinate position for the first intersection $O_1$ is determined based on the traveling direction at the first intersection $O_1$ (step S154). Additionally, a vertical display coordinate position for the first intersection $O_1$ is determined (step S155). Once the horizontal and vertical coordinate positions have been determined, the first intersection O is displayed in a display position on the screen, and an enlarged intersection image representing a 600 ft.×600 ft. area is displayed on the screen SCR with a predetermined zoom factor, so as to align the approach direction for the first intersection with the 12 o'clock direction (step S156). Finally, a first traveling direction arrow extending from the approach direction to the exit direction at the first intersection $O_1$ is drawn on the enlarged intersection image, and a second traveling direction arrow extending from the approach direction to the exit direction at the second intersection $O_2$ is drawn on the enlarged intersection image (step S157).

In this case, the unit checks whether or not the first intersection $O_1$ and the second intersection $O_2$ are within a predetermined area AR on the screen (step S158). If the two intersections are within the area, the display process is terminated. If the two intersections are out of the area, the display position of the first intersection is adjusted vertically to display the two intersections within the area and thereby complete the display process (see FIGS. 8A and 8B, step S159).

As described above, in the enlarged intersection image display method of an embodiment of the present invention, a correct traveling direction at an intersection may be obtained in a simple manner to display a correct traveling direction in an enlarged intersection image.

Further, in the enlarged intersection image display method of this embodiment, it is possible to display the enlarged intersection image such that the entire approach link is aligned with a 12 o'clock direction, and display as large an area as possible surrounding the traveling direction, along with a correct traveling direction in an enlarged intersection image, even when the guidance path encompasses two consecutive intersections.

Figure 12:
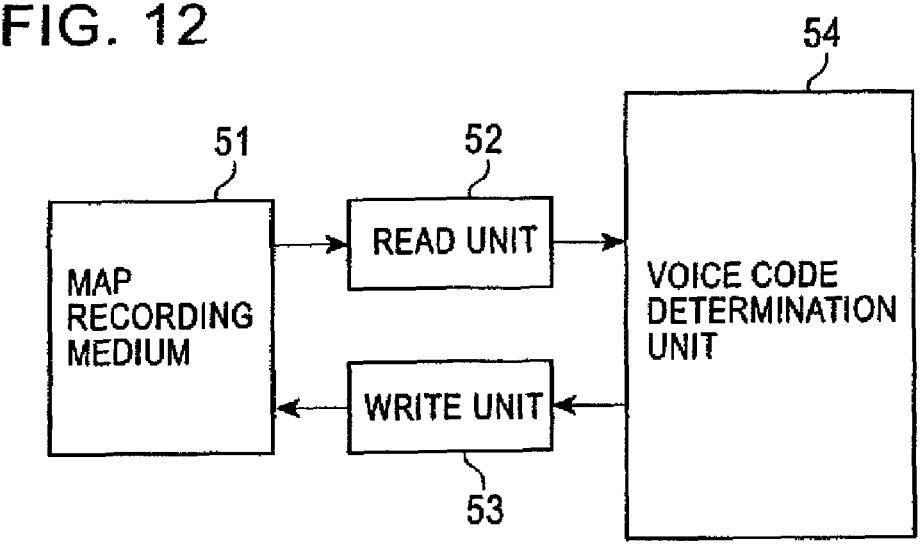
FIG. 12 is a diagram of a map information generating device according to an embodiment of the present invention.

(G) Generation of Map Information Including Voice Code for Voice Assist
(a) Map Information Generating Device FIG. 12 is a diagram of a map information generating device according to an embodiment of the present invention. Reference numeral 51 denotes a map storage medium storing digitized map data; reference numeral 52 denotes a map data read unit for reading desired map data from the map storage medium 51; reference numeral 53 denotes a voice code write unit for writing a voice code to the map storage medium 51; and reference numeral 54 denotes a voice code determination unit that determines a voice code for informing a driver about a traveling direction at a target intersection.

Figure 13:
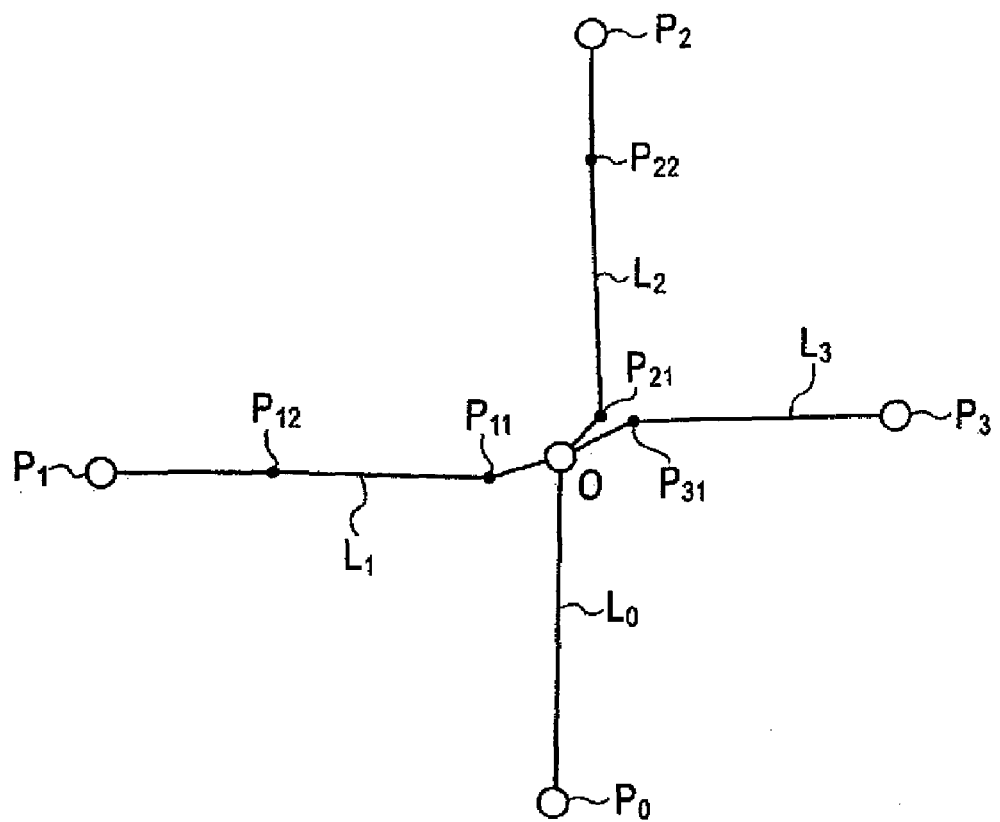
FIG. 13 illustrates intersection information.

The map data includes information about links and intersections, which constitute roads. FIG. 13 illustrates intersection information. FIG. 14 illustrates intersection information about an intersection including the four links shown in FIG. 13. In FIG. 13, the four links $L_0$ to $L_3$ are connected to an intersection O at one end, and the opposing ends of the links $L_0$ to $L_3$ terminate at nodes $P_0$ to $P_3$ respectively. A shape complementary point $P_{ij}$ in accordance with the digitized map data may be inserted into the links $L_0$ to $L_3$ if necessary for broken line approximation. As shown in FIG. 14, the intersection information includes an intersection ID (intersection No.) CPID, intersection link information CPLK, and guidance voice information GSCD. However, the guidance voice information GSCD is not originally recorded in the map storage medium 51 Rather, the guidance voice information GSCD is generated by the voice determination unit 54 and recorded in the map storage medium 51.

The intersection link information CPLK includes a link ID identifying the intersection links $L_0$ to $L_3$ and data (shape complementary point and node position data) indicating a shape of each link. The guidance voice information GSCD stores a code (voice code) for specifying a voice announcement to inform a driver of a traveling direction when the vehicle exits the intersection through an exit link. It is assumed that a predetermined link is an approach link and the other links are all exit links. Thus, the guidance voice information GSCD stores a voice code based on the assumption that each link is an approach link. The voice code determination unit 54 of FIG. 12 generates the above guidance voice information GSCD at the intersection based on the link information and the intersection information. In the above example, a target intersection is a single intersection. Provided that $L_0$ represents an approach link and $L_3$ represents an exit link, the voice code (right turn code) is stored in the guidance voice information GSCD and associated with the approach link $L_0$ and the exit link $L_3$.

Figures 15A, 15B:
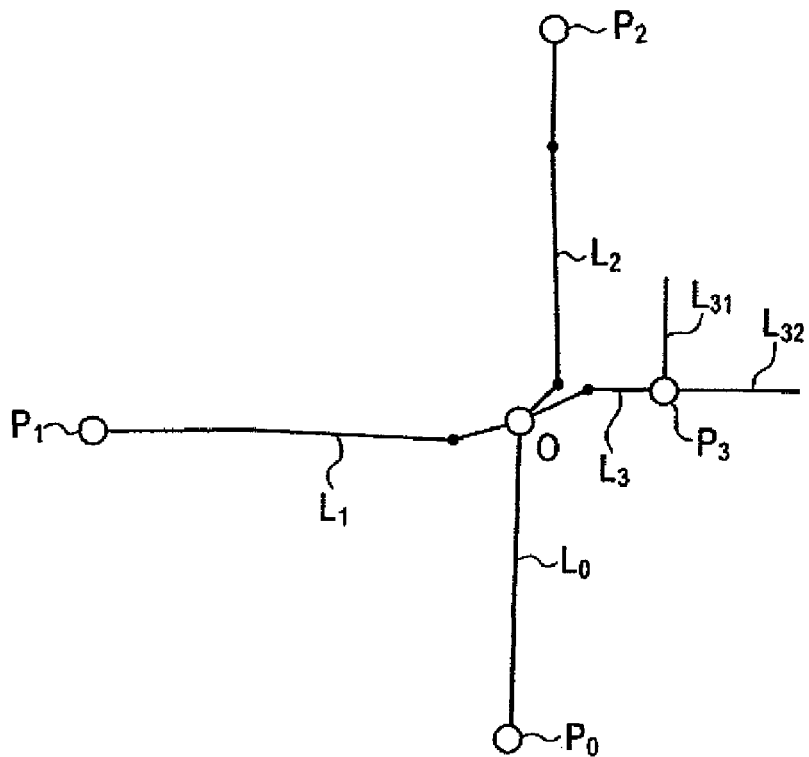
FIG. 15 illustrates intersection information for a target intersection that requires a double maneuver.

On the other hand, in the case of a double maneuver having a distance between intersections that is for example, 200 ft. or less, the voice code is stored in the guidance voice information GSCD and associated with an approach link and two exit links. For example, as shown in FIG. 15A, nodes O and $P_3$ (which are positioned on both sides of the exit link $L_3$) are intersections, the distance between O and $P_3$ is 200 ft. or less, and the two links $L_{31}$ and $L_{32}$ are connected by the node $P_3$. As shown in FIG. 15B, a first voice code (right turn code→left-turn code) is stored in the guidance voice information GSCD and associated with the approach link $L_0$, the first exit link $L_3$, and the second exit link $L_{31}$. Further, a second voice code (right turn code→straight code) is stored in the guidance voice information GSCD in association with the approach link $L_0$, the first exit link $L_3$, and the second exit link $L_{32}$.

(b) Overall Voice Code Generating Process

Figure 16:
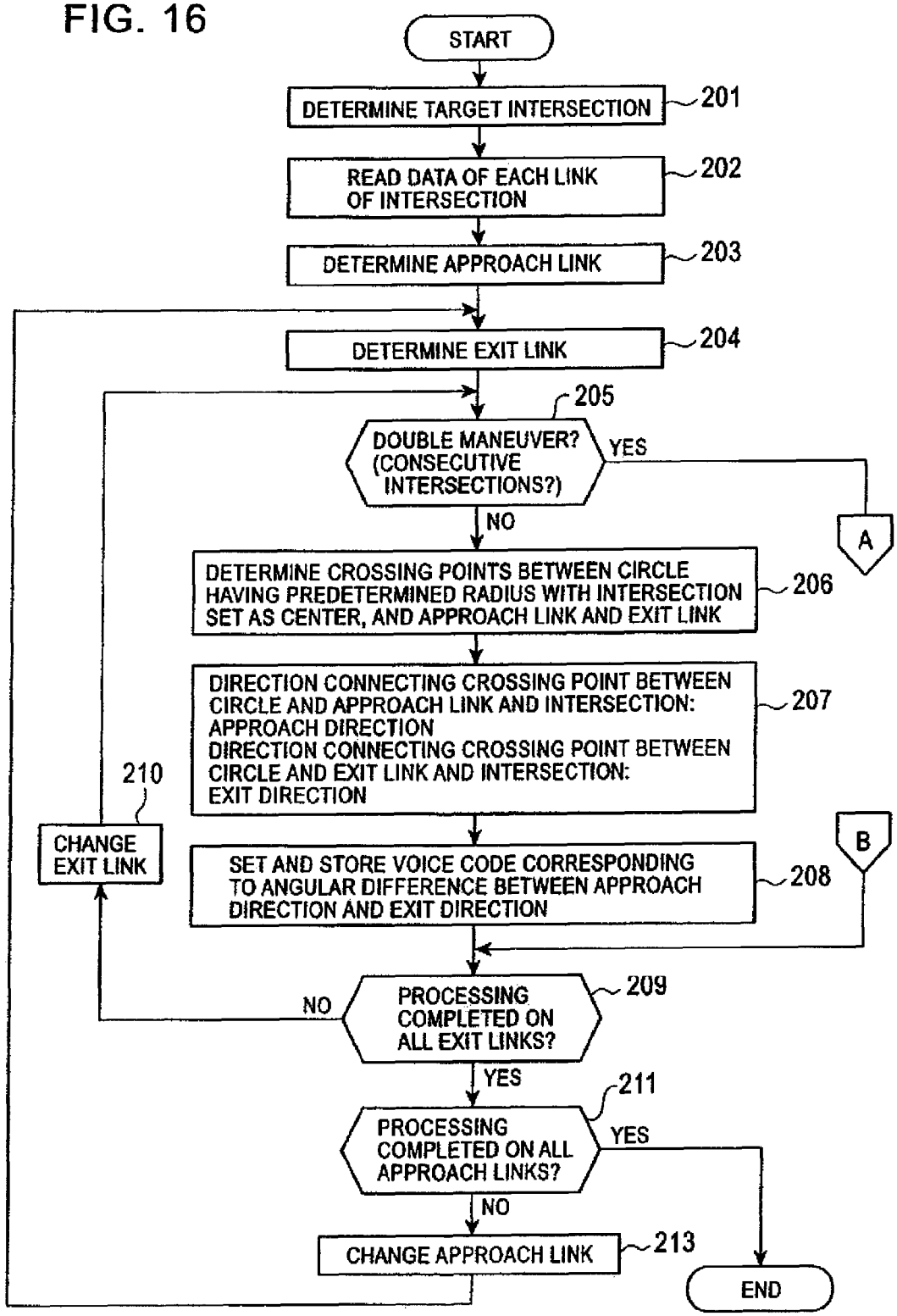
FIG. 16 is a flowchart of a voice code generating process using a voice code determination unit.
Figure 17:
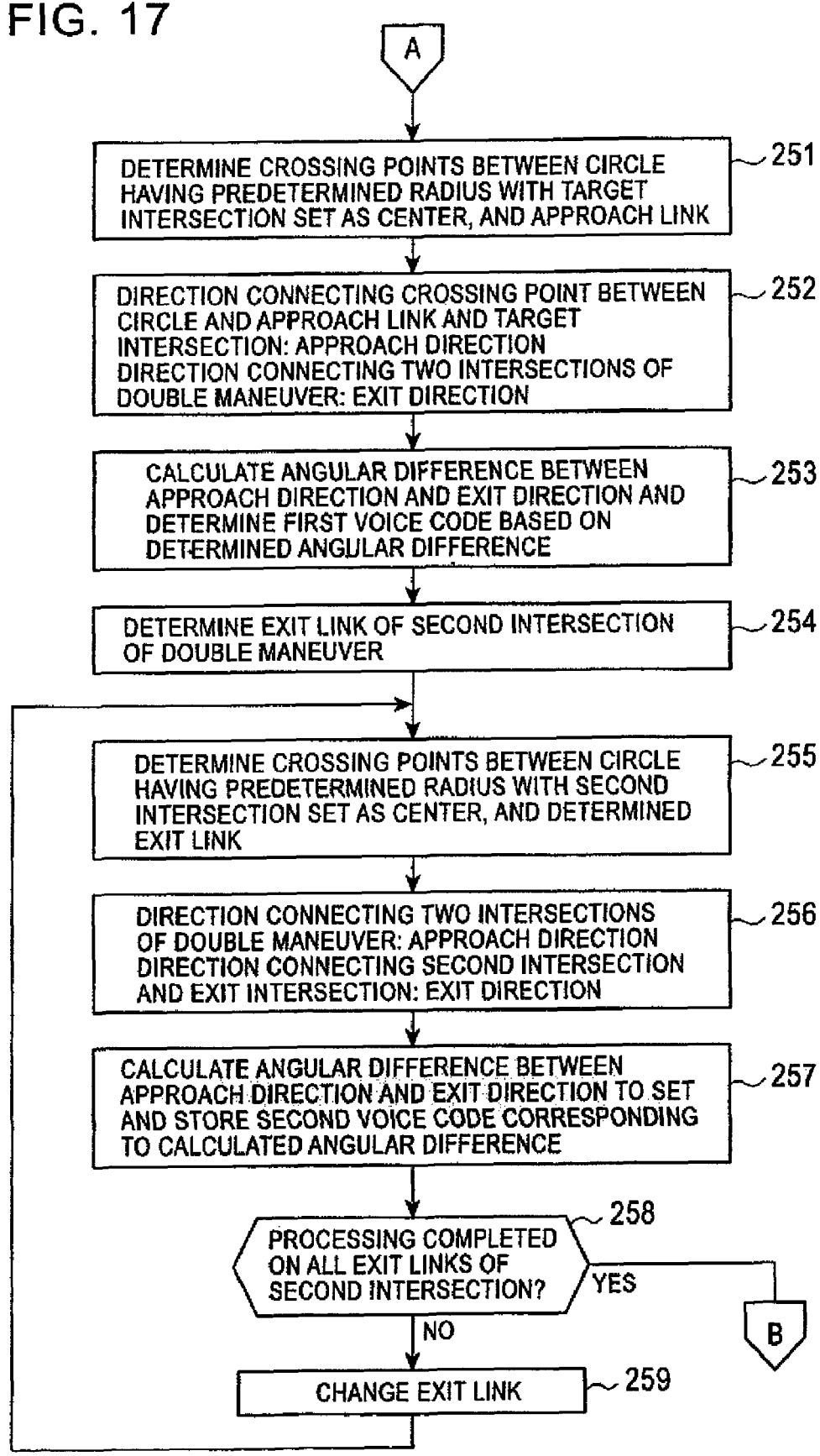
FIG. 17 is a flowchart of a voice code generating process using a voice code determination unit.

FIGS. 16 and 17 are flowcharts of the overall voice code generating process used by the voice code determination unit 54.

First, the voice code determination unit 54 selects an intersection to read and store intersection information for the intersection, as well as link information for the links connected to the intersection (steps S201 and S202). In addition, a predetermined link connected to the target intersection is set as an approach link and another link is set as an exit link (steps S203 and S204).

Next, the voice code determination unit 54 checks whether or not a distance between the next intersection in the direction of the exit link and the target intersection is less than or equal to a preset distance. In other words, the voice code determination unit 54 determines whether or not another intersection (double maneuver) is located in the exit link direction (step S205). If a double maneuver intersection is not found in the exit link direction, the voice code determination unit 54 draws a circle CIR (see FIGS. 1A and 1B) having a predetermined radius with the center set to the intersection, and determines crossing points (approach link crossing point and exit link crossing point) between the circle and the approach link and the exit link (step S206). In addition, a direction connecting the approach link crossing point and the intersection is set as an approach direction A, and a direction connecting the intersection and the exit link crossing point is set as an exit direction B (step S207). When the approach direction and the exit direction are determined, an angular difference between the approach direction and the exit direction is calculated to determine a traveling direction at the intersection based on the calculated angular difference (see FIG. 5B). A voice code indicating the traveling direction is written into a target intersection guidance voice information field GSCD (see FIG. 14) and associated with the approach link and the exit link determined in steps S203 and S204 (step S208).

Further, the voice code determination unit 54 sets the links other than the approach link as exit links and checks whether or not the voice code generating process described above is completed (step S209). If the process is not completed, the exit link is changed (step S210), and step S205 and the subsequent steps are repeated. On the other hand, if the above described process has been performed for all exit links to the approach link, the voice code determination unit 54 checks whether the voice code generating process described above has been completed under the condition that each of the links have been set to the approach link (step S211). If the process has not been completed, the approach link is changed (step S211), and step S204 and the subsequent steps are repeated.

On the other hand, in step S205, if an intersection (second intersection) of a double maneuver is found in the exit link direction, a circle CIL having a predetermined radius with the center set to a target intersection (first intersection) is drawn (see FIGS. 4A to 4C), and the intersections (approach link crossing points) between the circle and the approach link are calculated (step S251), as shown in FIG. 17. In addition, a direction connecting the approach link crossing point and the first intersection is set as an approach direction A, and a direction connecting the first intersection and the second intersection is set as an exit direction B (step S252). Once the approach direction and the exit direction have been set, an angular difference between the approach direction and the exit direction is calculated to determine a traveling direction at the first intersection based on the angular difference (step S253).

Next, an exit link at the second intersection of the double maneuver is determined (step S254), and a crossing point between a circle having a predetermined radius and its center set at the second intersection and an exit link at the second intersection is calculated (step S255). A direction connecting the first intersection and the second intersection is then set as an approach direction for the second intersection, a direction connecting the second intersection and the exit link crossing point for the second circle is set as an exit direction (step S256) for the second intersection, and an angular difference between the approach direction and the exit direction for the second intersection is determined. The traveling direction at the second intersection is determined based on the calculated angular difference. A voice code indicating the two traveling directions at the first and second intersections is written into the guidance voice information field GSCD (see FIG. 15B) and associated with the approach link and the first and second exit links determined in steps S203, S204, and S254 (step S257).

Next, the voice code determining unit 54 checks whether or not the voice code generating process has been completed for all exit links of the second intersection (step S258). If the process is not complete, the exit link is changed (step S259), and step S255 and the subsequent steps are repeated. On the other hand, if the process is completed for all exit links, the process returns to step S209 and step S209 and the subsequent steps are repeated.

As described above, when each link is set as an approach link and the other links are set as exit links a voice code indicating a traveling direction is written to the guidance voice information field of the intersection data. Then, when a vehicle approaches a target intersection, the intersection audio assist unit 26b (see FIG. 9) announces a traveling direction using the voice code.

(H) Audio Assist Process

Figure 18:
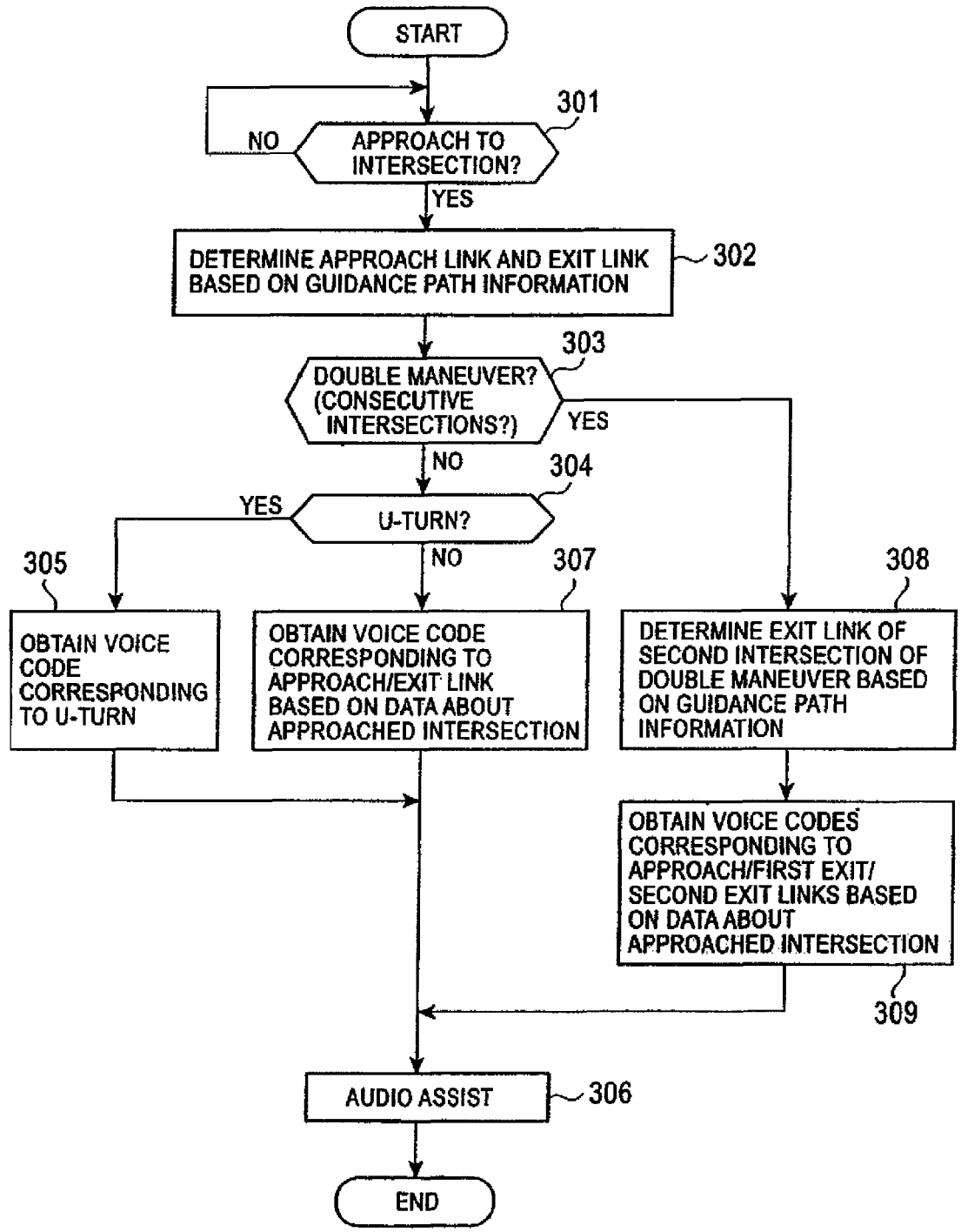
FIG. 18 is a flowchart of an audio assist process using an intersection audio assist unit.
Figure 19A:
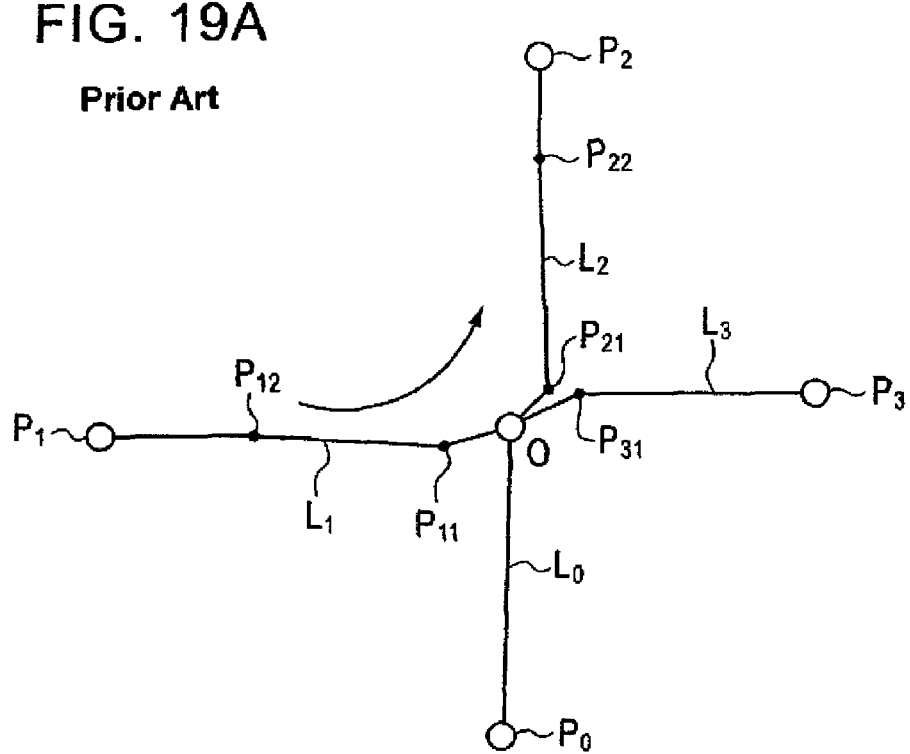
FIGS. 19A and 19B illustrate digitalized map data.
Figure 19B:
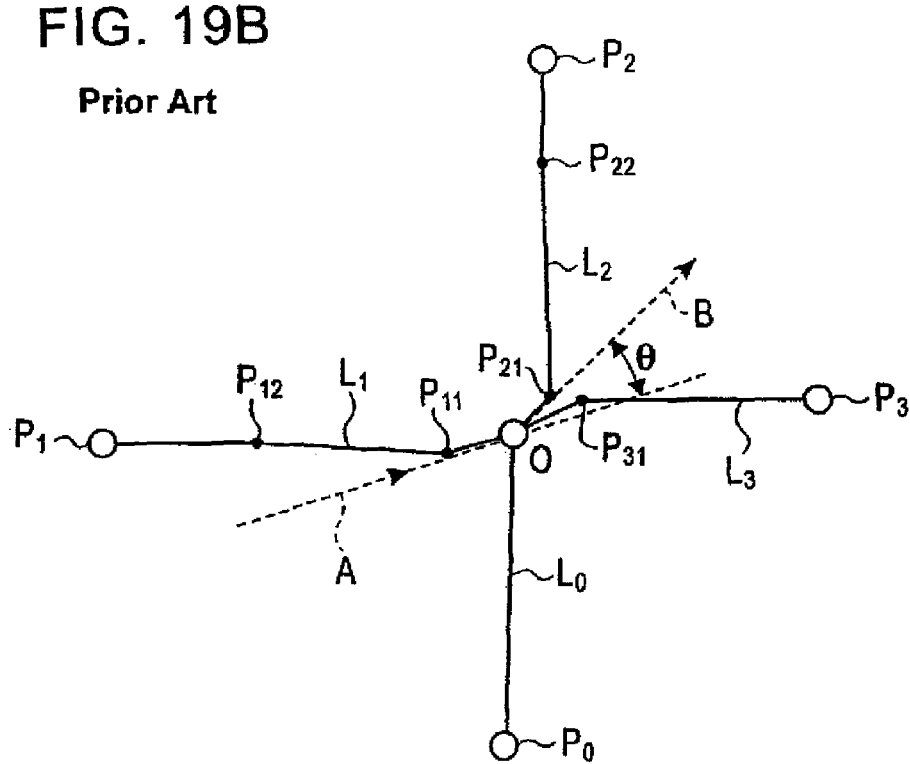
Figure 20:
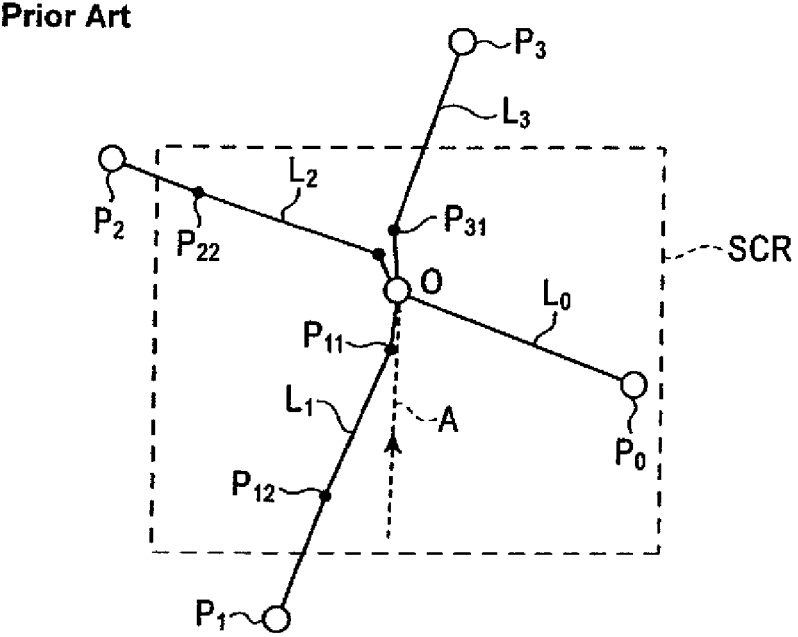
FIG. 20 illustrates some shortcomings of conventional intersection map displaying methods.
Figure 21A:
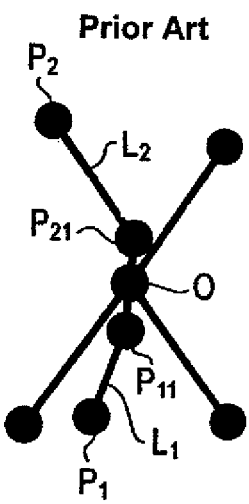
FIGS. 21A and 21B illustrate a conventional intersection guidance method.
Figure 21B:
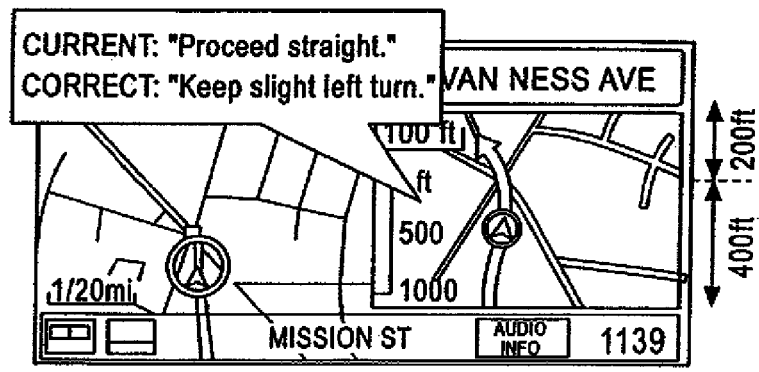
Figure 22A:
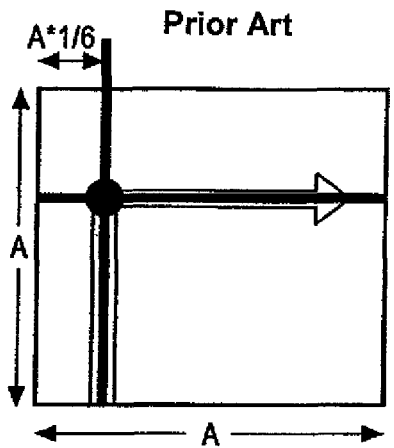
FIGS. 22A and 22B illustrate an intersection display position in a conventional navigation system.
Figure 22B:
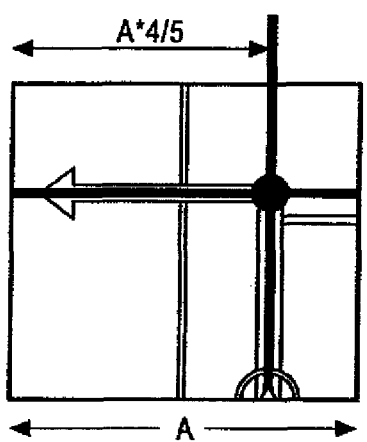

FIG. 18 is a flowchart of an audio assist process for the intersection audio assist unit 26b.

The intersection audio assist unit 26b monitors a vehicle to determine whether the vehicle has approached an intersection based on guidance path information and vehicle position information (step S301). If the vehicle approaches the intersection, the unit sets the road on which the vehicle is currently traveling as the approach link and a road exiting from the intersection as an exit link (step S303). The unit then determines whether or not the target intersection is a double maneuver. If the intersection is a single intersection, and not a double maneuver, the unit checks whether or not a U-turn has been selected (step S304). If a U-turn has been selected, a voice code corresponding to the U-turn is obtained (step S305) to assist a driver in making a U-turn by voice (step S306).

On the other hand, if a U-turn is not selected in step S304, the unit retrieves a voice code associated with the approach link and the exit link and stored in intersection data for the target intersection (step S307). A traveling direction at the intersection is then announced using the voice code (step S306). Further, in step S303, if the target intersection is a double maneuver, the exit link at the second intersection is determined based on the guidance path information (step S308), and a voice code stored in association with the approach link and the exit link is retrieved from intersection data for the target intersection (step S309), and the traveling direction at the intersection is announced using the voice code (step S306).

As described above, in the map generating method according to an embodiment of the present invention, it is possible to determine a traveling direction at an intersection in a simple manner, insert voice data corresponding to the traveling direction into intersection data, and inform a driver by voice of the correct traveling direction using the voice data for the intersection. Further, even if a target intersection is a double maneuver (two consecutive intersections), the driver can be informed of the correct traveling direction by voice.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An enlarged intersection image display method for a navigation system displaying an enlarged intersection image on a screen when a vehicle travels along a guidance path and approaches an intersection, the method comprising:
    defining, by an intersection guide unit, a circle having a predetermined radius, wherein a center of the circle is set to a first intersection;
    determining crossing points between the circle and an approach link and an exit link of the first intersection;
    setting a direction connecting the approach link crossing point and the first intersection as an approach direction, and setting a direction connecting the first intersection and the exit link crossing point as an exit direction; and
    drawing, on a screen of a display, when the approach link and the approach direction differ, and/or the exit link and the exit direction differ, an enlarged intersection image such that the approach direction is aligned with a 12 o'clock direction on the screen, and a traveling direction arrow extending from the approach direction toward the exit direction.

2. The enlarged intersection image display method according to claim 1, the method further comprising:
    calculating an angular difference between the approach direction and the exit direction;
    calculating a coordinate position of the first intersection on the screen based on the angular difference; and
    displaying the enlarged intersection image to overlap the coordinate position with the first intersection.

3. The enlarged intersection image display method according to claim 2, wherein the coordinate position is calculated by a method comprising:
    determining a traveling direction at the first intersection based on the angular difference;
    determining a horizontal coordinate position of the first intersection such that the first intersection is displayed at a center of the screen in a horizontal direction, if the traveling direction is a straight direction, a slight right turn direction, or a slight left turn direction;
    determining the horizontal coordinate position of the first intersection such that the first intersection is displayed on a left side of the screen as viewed in a horizontal direction, if the traveling direction is a right turn direction or a sharp right turn direction; and
    determining the horizontal coordinate position of the first intersection such that the first intersection is displayed on a right side of the screen as viewed in a horizontal direction, if the traveling direction of the vehicle is a left turn direction or a sharp left turn direction.

4. The enlarged intersection image display method according to claim 3, wherein the coordinate position is calculated by determining a vertical coordinate position of the first intersection such that the first intersection is displayed in an upper position of the screen as viewed in a vertical direction, regardless of the traveling direction.

5. The enlarged intersection image display method according to claim 1, the method further comprising:
    determining whether a distance from the first intersection to a second subsequent intersection on the guidance path is less than or equal to a preset distance;
    setting a direction connecting the first intersection and the approach link of the first intersection as an approach direction for the first intersection;
    setting a direction connecting the first intersection and the second intersection as an exit direction for the first intersection, if the distance between the first intersection and the second intersection is less than or equal to the preset distance;
    drawing the enlarged intersection image including the first and second intersections such that the approach direction for the first intersection is aligned with a 12 o'clock direction on the screen; and
    drawing a first traveling direction arrow extending from the approach direction for the first intersection toward the exit direction.

6. The enlarged intersection image display method according to claim 5, the method further comprising:
    determining a crossing point between a link exiting from the second intersection and a second circle having a predetermined radius, wherein a center of the second circle is set to the second intersection;
    setting a direction connecting the first intersection and the second intersection as an approach direction for the second intersection, and a direction connecting the second intersection and the exit link crossing point of the second circle as the exit direction for the second intersection; and
    drawing, on the screen of a display, a second traveling direction arrow extending from the approach direction for the second intersection to the exit direction for the second intersection.

7. The enlarged intersection image display method according to claim 5, the method further comprising:
    calculating an angular difference between the approach direction for the first intersection and the exit direction for the first intersection;
    calculating a coordinate position on the screen of the display for the first intersection based on the angular difference; and
    displaying an enlarged intersection for the first intersection at the calculated coordinate position.

8. The enlarged intersection image display method according to claim 7, wherein the coordinate position is determined by a method comprising:
    determining the traveling direction at the first intersection based on the angular difference;
    determining a horizontal coordinate position on the screen of the display for the first intersection such that the first intersection is displayed at a center of the screen in a horizontal direction, if the traveling direction is a straight direction, a slight right turn direction, or a slight left turn direction;
    determining a horizontal coordinate position on the screen of the display for the first intersection such that the first intersection is displayed on a left side of the screen as viewed in a horizontal direction, if the traveling direction is a right turn direction or a sharp right turn direction; and determining a horizontal coordinate position on the screen of the display for the first intersection such that the first intersection is displayed on a right side of the screen as viewed in a horizontal direction, if the traveling direction of the vehicle is a left turn direction or a sharp left turn direction.

9. The enlarged intersection image display method according to claim 8, wherein the method of determining the coordinate position further comprises:

determining a vertical coordinate position on the screen of the display for the first intersection such that both the first and second intersections are displayed on the screen.

10. A map information generating method for generating map information including voice information used to announce a traveling direction at an intersection, the method comprising:

retrieving, by a map information generating device comprising a map storage medium, shape data from map information for each link connected to an intersection node;

setting predetermined links as an approach link and an exit link;

determining crossing points between a circle having a predetermined radius and its center set to a first intersection, and an approach link and an exit link;

setting a direction connecting the crossing point for the approach link and the first intersection as an approach direction, and setting a direction connecting the first intersection and the crossing point for the exit link as an exit direction, when the approach link and the approach direction differ, and/or the exit link and the exit direction differ;

calculating an angular difference between the approach direction and the exit direction;

determining a traveling direction at the first intersection based on the calculated angular difference;

determining a voice code for announcing the traveling direction; and adding the voice code to intersection data contained in the map information.

11. The map information generating method according to claim 10, the method further comprising:

determining the voice code for all possible combinations of approach links and exit links.

12. The map information generating method according to claim 10, the method further comprising:

determining whether a distance from the first intersection to a second subsequent intersection on the guidance path is less than or equal to a preset distance;

setting a direction connecting the first intersection and the approach link of the first intersection as an approach direction for the first intersection, and setting a direction connecting the first intersection and the second intersection as an exit direction for the first intersection, if the distance between the first intersection and the second intersection is less than or equal to the preset distance;

calculating an angular difference between the approach direction and the exit directions for the first intersection in order to determine the traveling direction at the first intersection based on the calculated angular difference;

determining a crossing point between a link exiting from the second intersection and a second circle having a predetermined radius with its center set to the second intersection;

setting a direction connecting the first intersection and the second intersection as an approach direction for the second intersection, and setting a direction connecting the second intersection and the crossing point for the link exiting from the second intersection as an exit direction for the second intersection;

determining voice codes for announcing traveling directions at the first and second intersections; and adding the voice codes to the intersection data.

13. A navigation system for displaying an enlarged intersection image on a screen when a vehicle travels along a guidance path and approaches an intersection, the system comprising:

a guidance path memory configured to store a guidance path;

an approach detecting unit configured to detect whether the vehicle is approaching a first intersection on the guidance path;

an enlarged intersection image generating unit configured to determine crossing points between a circle having a predetermined radius with its center set to the first intersection, and an approach link and an exit link, set a direction connecting the crossing point for the approach link and the first intersection as an approach direction, set a direction connecting the first intersection and the crossing point for the exit link as an exit direction, and when the approach link and the approach direction differ, and/or the exit link and the exit direction differ, generate an enlarged intersection image such that the approach direction is aligned with a 12 o'clock direction on a screen, and generate a traveling direction arrow extending from the approach direction toward the exit direction; and a display unit for displaying the enlarged intersection image.

14. The navigation system according to claim 13, further comprising:

an audio assist unit configured to retrieve a voice code for announcing a traveling direction corresponding to an angular difference between the approach direction and the exit direction, and announce the traveling direction using the voice code.

15. The navigation system according to claim 13, wherein the enlarged intersection image generating unit calculates an angular difference between the approach direction and the exit direction to calculate a coordinate position of the first intersection on a screen of the display unit such that the enlarged intersection image is displayed with the first intersection overlapping the coordinate position.

16. The navigation system according to claim 15, wherein the enlarged intersection image generating unit determines a horizontal coordinate position of the first intersection such that the first intersection is displayed at a center of the screen in a horizontal direction if the traveling direction is a straight direction, a slight right turn direction, or a slight left turn direction, determines the horizontal coordinate position of the first intersection such that the first intersection is displayed on a left side of the screen as viewed in a horizontal direction if the traveling direction is a right turn direction or a sharp right turn direction, and determines the horizontal coordinate position of the first intersection such that the first intersection is displayed on a right side of the screen as viewed in a horizontal direction if the traveling direction of the vehicle is a left turn direction or a sharp left turn direction.

17. The navigation system according to claim 16, wherein the enlarged intersection image generating unit determines a vertical coordinate position of the first intersection such that the first intersection is displayed in an upper position of the screen, regardless of the traveling direction.

18. The navigation system according to claim 13, wherein the enlarged intersection image generating unit is configured to determine whether a distance from the first intersection to a second subsequent intersection on the guidance path is less than or equal to a predetermined distance, and set a direction connecting the first intersection and the approach link as an approach direction for the first intersection, set a direction connecting the first intersection and the second intersection as an exit direction for the first intersection, generate the enlarged intersection image including both the first and second intersection such that the approach direction is aligned with a 12 o'clock direction on the screen, and draw a first traveling direction arrow extending from the approach direction for the first intersection toward the exit direction for the first intersection, if the distance is less than or equal to the preset distance.

19. The navigation system according to claim 18, wherein the enlarged intersection image generating unit is configured to determine a second crossing point between a link exiting from the second intersection and a second circle having a predetermined radius with its center set to the second intersection, set a direction connecting the first intersection and the second intersection as an approach direction for the second intersection, set the direction connecting the second intersection and the crossing point for the second circle as an exit direction for the second intersection, and generate a second traveling direction arrow image that extends from the approach direction for the second intersection toward the exit direction for the second intersection.

20. The navigation system according to claim 19, wherein the enlarged intersection image generating unit is configured to calculate an angular difference between the approach direction for the first intersection and an exit direction for the first intersection, calculate a coordinate position for the first intersection on the screen in accordance with the angular difference, and display an enlarged intersection image with the first intersection located at the coordinate position.

\* \* \* \* \*